US012205428B1

(12) United States Patent
Khalid

(10) Patent No.: US 12,205,428 B1
(45) **Date of Patent: *Jan. 21, 2025**

(54) INTELLIGENT SECURE KEYLESS ENTRY SYSTEM

(71) Applicant: Abdulla Khalid, Murrieta, CA (US)

(72) Inventor: Abdulla Khalid, Murrieta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,509

(22) Filed: Jun. 26, 2023

Related U.S. Application Data

(63) Continuation of application No. 17/464,001, filed on Sep. 1, 2021, now Pat. No. 11,688,218, which is a continuation-in-part of application No. 16/787,800, filed on Feb. 11, 2020, now abandoned, which is a continuation-in-part of application No. 16/733,561, filed on Jan. 3, 2020, now abandoned.

(60) Provisional application No. 62/788,735, filed on Jan. 4, 2019.

(51) Int. Cl.
*G07C 9/21* (2020.01)
*G07C 9/00* (2020.01)
*G07C 9/27* (2020.01)

(52) U.S. Cl.
CPC ........... *G07C 9/21* (2020.01); *G07C 9/00571* (2013.01); *G07C 9/00896* (2013.01); *G07C 9/27* (2020.01); *G07C 2009/00928* (2013.01)

(58) Field of Classification Search
CPC ........ G07C 9/21; G07C 9/27; G07C 9/00571; G07C 9/00896; G07C 2009/00928
USPC .................................................... 235/472.03
See application file for complete search history.

(56) References Cited

U.S. PATENT DOCUMENTS

| | | | | |
|---|---|---|---|---|
| 10,389,982 | B1 * | 8/2019 | Fu | H04N 7/185 |
| 11,688,218 | B2 * | 6/2023 | Khalid | G07C 9/00658<br>235/472.03 |
| 2018/0075681 | A1 * | 3/2018 | Scalisi | G06K 7/1413 |
| 2019/0333302 | A1 * | 10/2019 | Kagnew | G06Q 10/0836 |
| 2020/0253026 | A1 | 8/2020 | Allan | |

* cited by examiner

*Primary Examiner* — Daniel A Hess
(74) *Attorney, Agent, or Firm* — The Law Office of Patrick F. O'Reilly III, LLC

(57) ABSTRACT

The present invention is directed to intelligent secure keyless keypad transmitter entry system mounted outside property integrated into an existing motorized garage door opening system or any motorized gate system for secure entry and package delivery using a barcode scanner. The invention uses package tracking codes stored in advance to open a door or gate with a delivery notification to the owner. Motion detection and facial recognition biometric cameras allow invited persons to enter property. The camera and microphone/speaker allow video communication via external devices. The keypad may be used in conjunction with the LED screen to program the console device with temporary or permanent PIN codes for entry code allowing owners to verify access and exit of service providers. The console device offers complete remote control of device functions and all activity on the device to be transmitted electronically to the owner's mobile device.

20 Claims, 20 Drawing Sheets

INTELLIGENT SECURE KEYLESS ENTRY SYSTEM

CROSS REFERENCE

This application is a continuation-in-part and claims benefit of U.S. patent application Ser. No. 17/464,001 filed Sep. 1, 2021, which is a continuation-in-part and claims benefit of U.S. patent application Ser. No. 16/787,800 filed Feb. 11, 2020, which is a continuation-in-part and claims benefit of U.S. patent application Ser. No. 16/733,561 filed Jan. 3, 2020, which is a non-provisional and claims benefit of U.S. Provisional Application No. 62/788,735 filed Jan. 4, 2019, the disclosures of which are incorporated herein in their entirety by reference.

BACKGROUND OF THE INVENTION

The present invention relates to secure keyless opening methods for garage doors or other entry systems to be used for home delivery through a barcode sensor, or alternative entry to the premises through a PIN code, facial recognition, or a terminal such as an external software application.

BRIEF SUMMARY OF THE INVENTION

It is an objective of the present invention to provide an improved wall-mountable console device with intelligent, secure, and keyless entry methods for garage doors, gates, and like barriers, as specified in the independent claims. Embodiments of the invention are given in the dependent claims. Embodiments of the present invention can be freely combined with each other if they are not mutually exclusive.

The present invention provides an improved wall-mountable console device with intelligent, secure, and keyless entry methods for garage doors, gates, and like barriers. The invention provides a wall-mountable console device that replaces cumbersome conventional numeric keypad programming with an easy-to-follow menu-driven programming methodology and/or a connected external software application. The invention further provides a menu-driven programming methodology where individual visual indicators signal a menu choice. The present invention conveys the nature of secure entry and provides a user with meaningful programming and instant feedback on the LED screen of the console device or on a connected external software application.

The present invention further provides the ability to easily program the console device by using an LED screen-driven menu and/or a wirelessly connected computing device with an external software application. The LED screen-driven menu provides instant feedback during the programming session or during normal use, and wireless feedback to a connected computing device. The LED screen-driven menu and the wirelessly-connected computing device may include a "READY" LED to provide information on whether the device is in a "home" state or a "ready" state, and an "ERROR" LED to provide a user with feedback on conditions. The LED screen driven menu may further include items related to PINs and door designator references. The present invention also provides an easily ascertainable indication of the health and the condition of the intelligent keypad, visible through the LED screen or the external software application on the wirelessly connected device. A user can easily program the same PIN for multiple doors using the same console device, program multiple PINs for a single door, and create a separate temporary PIN for one or more doors.

The present invention further provides a barcode scanner and a motion-detection infrared camera with biometric facial recognition features to provide additional entry methods to users. A user can wirelessly upload any tracking numbers from any Internet purchase directly to the intelligent secure keyless console device to allow secure delivery using the barcode scanner on the intelligent secure keyless console device. Scanning the barcode of a package that matches an uploaded tracking number results in the opening of the garage door, the closing of the garage door after a certain amount of time has passed, and instant confirmation of the opening of the garage door, the closing of the garage door, and the delivery of the package relayed wirelessly to the connected computing device. This aspect of the present invention advantageously provides for a significant decrease in the likelihood of a package getting stolen when said package is delivered to a home when no one is around to bring it in.

While prior systems (see Scalisi 2018, US 2018/0075681 A1) scan barcode information by taking a picture and parsing the image for a barcode to scan and compare to stored barcodes, the present invention comprises a dedicated barcode scanner. The use of a dedicated barcode scanner provides the system with a more simple and energy efficient method of barcode scanning due to the lower number of necessary computations.

The present invention further provides biometric facial recognition to allow family and friends to easily access the premises with instant confirmation of the entry relayed to the external software application. The infrared camera can also act as a security camera with motion detection and live video feed of the front of the property.

One of the unique and inventive technical features of the present invention is the use of a dedicated barcode scanner for the purpose of secure package delivery. Without wishing to limit the invention to any theory or mechanism, it is believed that the technical feature of the present invention advantageously provides for a secure, efficient, and simple way for packages to be delivered to the interior of a home without the need for a person to be home to receive the package. None of the presently known prior references or work has the unique inventive technical feature of the present invention. Furthermore, the use of a dedicated barcode scanner for the purpose of secure package delivery is counterintuitive. The reason that it is counterintuitive is because the prior references teach away from the present invention. For example, Scalisi 2018, US 2018/0075681 A1 teaches the use of a camera to take a picture of a package and parse the picture for a barcode to scan, while the present invention simply scans that barcode directly from the package.

Another one of the unique and inventive technical features of the present invention is the implementation of the garage door unit with the console device for actuating the garage door control system such that only the methods provided by the console device are able to open the garage door. Without wishing to limit the invention to any theory or mechanism, it is believed that the technical feature of the present invention advantageously provides for completely secure garage door control with far reduced opportunity for hacking or unintended actuation when compared to prior systems for garage door control. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
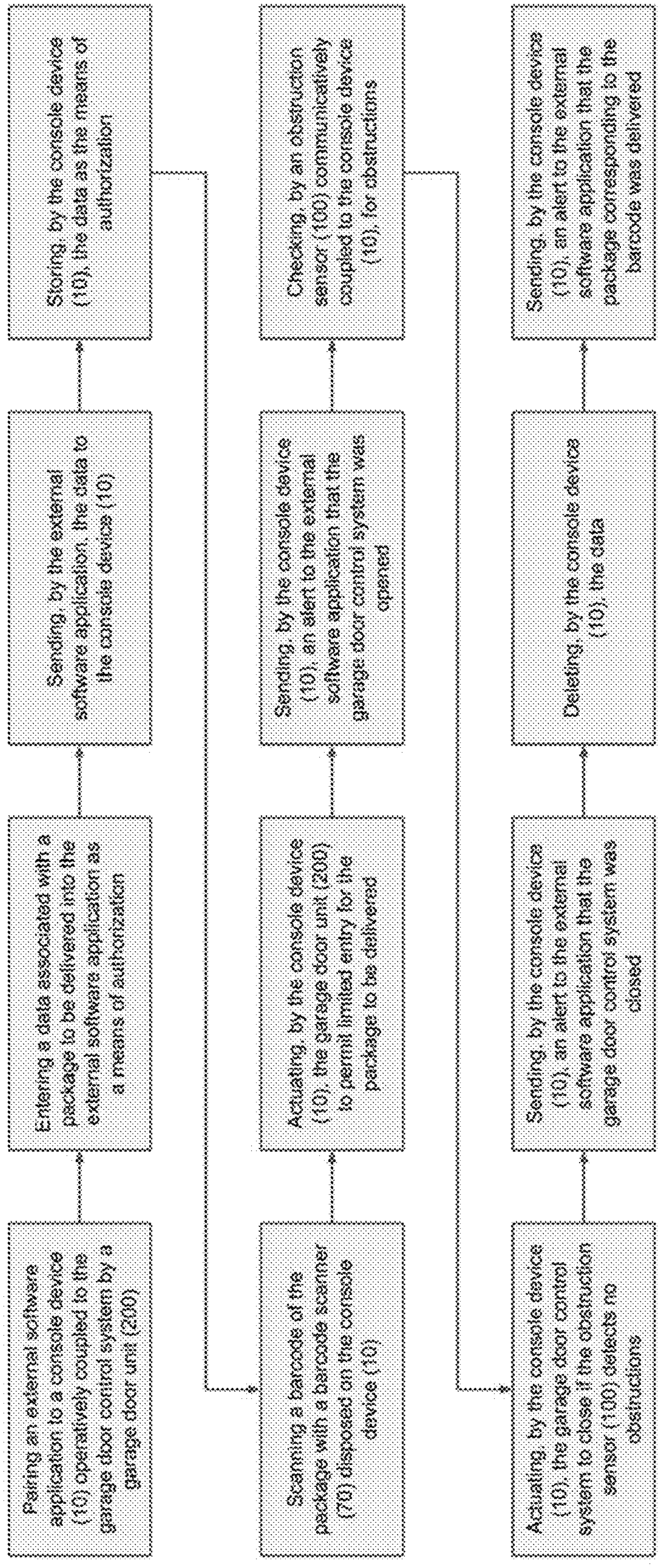
FIG. 1 shows a method of the present invention for using a console device to authorize a motorized entry system to permit entry through the use of a barcode transmitted from an external software application.

Following is a list of elements corresponding to a particular element referred to herein:

10 console device
12 weather-proof housing for console device
20 frontal camera
30 side camera
40 microphone-speaker
50 LED screen
60 backlight keypad
70 barcode scanner
80 cover with solar cell
90 processor
92 memory device
94 transmitter/receiver
96 RAM device
100 obstruction sensor
110 console device
112 housing
114 microphone-speaker
116 motion sensor
117 night vision infrared LED
118 camera
120 rotatable cover
122 camera aperture in rotatable cover
124 touchscreen
126 push button
128 barcode scanner
130 solar panel
132 garage door
134 dwelling
136 package
140 receiver unit control board
142 ultrasonic module distance sensor
144 AC input
146 programming jumpers
148 camera module
150 PIR motion detector
152 relay module
154 connectors
156 LED
158 SB connector
200 garage door unit Referring to FIG. 1, the present invention features a method for intelligent secure keyless authorization for package delivery for a motorized entry system through the use of an external software application. In some embodiments, the method may comprise integrating a console device (10) into a motorized entry system and communicatively coupling the external software application with the console device (10). From the external software device, data of an incoming package may be entered as a means of authorization. The external software application may then send the data to the console device (10) where it will be stored as a means of authorization. When a barcode of the package is scanned by a barcode scanner (70) disposed on the console device (10), the console device (10) checks if the scanned barcode corresponds to the data and actuates the motorized entry system to permit entry for the package to be delivered if a match is found. A person delivering the package may then place the package indoors. The console device (10) may send an alert to the external software application that the motorized entry system was opened. The method may further comprise an obstruction sensor (100) checking for obstructions in the closing path of the motorized entry system on a fixed interval. If a check is completed and no obstructions are detected by the obstruction sensor (100), the console device (10) may actuate the motorized entry system to close. The console device (10) may send an alert to the external software application that the motorized entry system was closed. The method may further comprise deleting the matched barcode as a means of authorization, and sending an alert to the external software application that the package corresponding to the barcode was delivered. In some embodiments, the console device (10) communicates with the external software application through the use of WiFi and Bluetooth Low Energy connections. In some embodiments, the data received by the console device (10) is a tracking number. In some embodiments, the fixed interval of obstruction sensor (100) checks is every 30 to 90 seconds.

Figure 2:
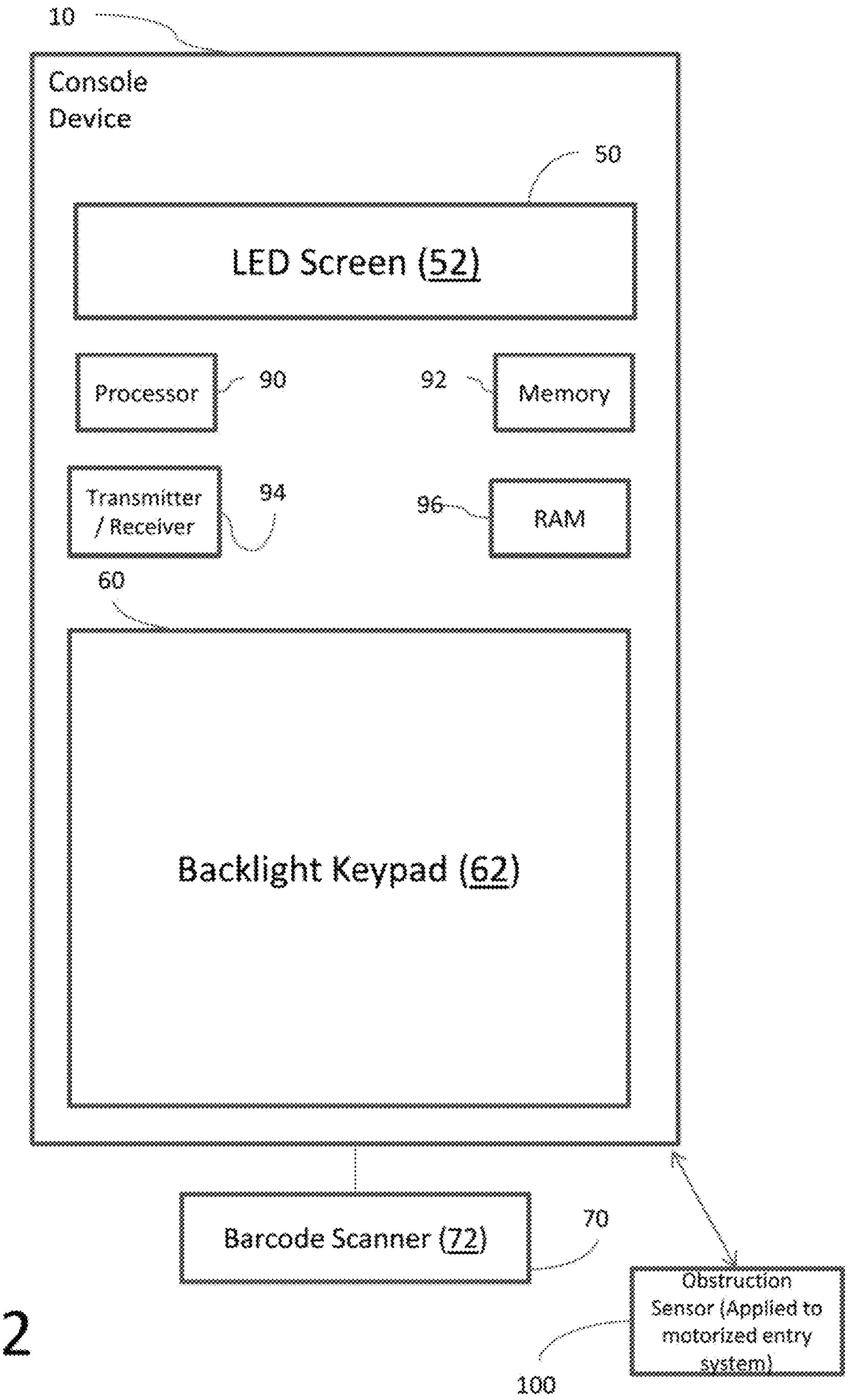
FIG. 2 shows a system of the present invention for using a console device to authorize a motorized entry system to permit entry through the use of a barcode transmitted from an external software application.
Figure 3:
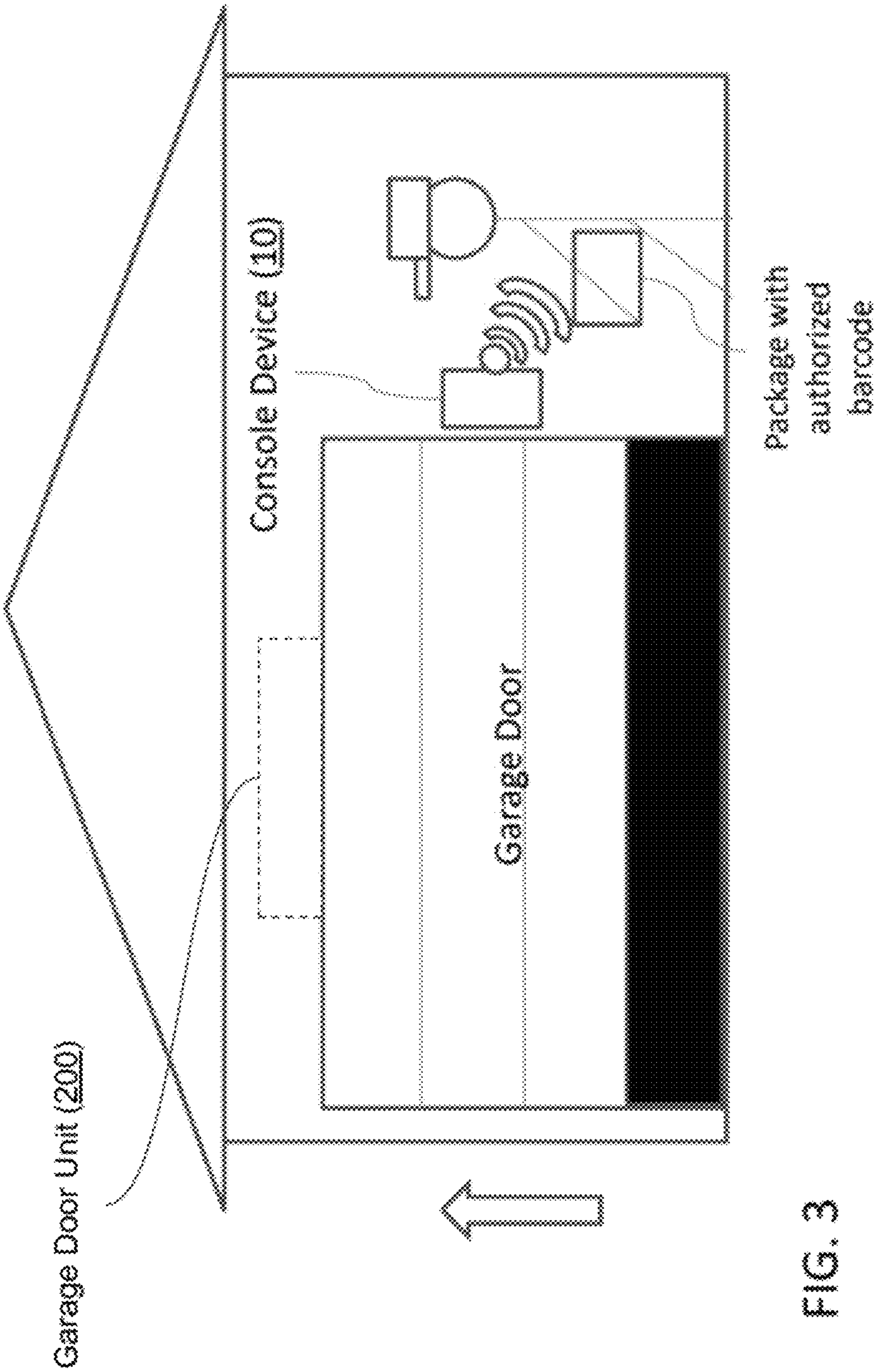
FIG. 3 shows a diagram of how a delivery driver may use the present invention to scan a barcode on a package and authorize the console device to permit entry for the package to be delivered inside.

Referring to FIG. 2, the present invention features a system for intelligent secure keyless authorization for package delivery through the use of an external software application. In some embodiments, the system may comprise a console device (10). The console device (10) may comprise an LED screen (50), a backlight keypad (60), a barcode scanner (70), a processor (90), a RAM device (96), a memory device (92), and a transmitter/receiver device (94). The processor (90) may be capable of executing computer-readable instructions stored in the memory device (92), and the memory device (92) may store data and computer-readable instructions for comparing data to a barcode and actuating a motorized entry system to permit entry. The transmitter/receiver device (94) may communicate with a home network, and use the home network to communicate with the external software application.

In some embodiments, the system of the present invention may further comprise the console device (10) being integrated into the motorized entry system and communicatively coupled to the external software application through the use of the transmitter/receiver device (94). The console device (10) may be communicatively coupled to an obstruction sensor (100) disposed on the motorized entry system. A user may input data for a package that has yet to arrive into the external software application, which will then send the data to the console device (10). The console device (10) may then receive the data through the use of the transmitter/receiver device (94). From the transmitter/receiver device (94), the data is stored in the memory device (92). The barcode scanner (70) may scan a barcode from a package being delivered and transmit the scanned barcode to the processor (90). The processor (90) may accept the barcode from the barcode scanner (70) and execute computer-readable instructions stored in the memory device (92) to compare the scanned barcode to the data stored in the memory device (92). Upon finding a match between the scanned barcode information and the data, the processor (90) actuates the motorized entry system to permit entry and marks the stored data as matched. The transmitter/receiver (94) device may then send an alert to the external software application to notify that the motorized entry system was opened.

In some embodiments, the obstruction sensor (100) may begin checking for obstructions in the closing path of the motorized entry system on a fixed interval. If a check is passed and the obstruction sensor (100) does not detect any obstructions in the closing path, the obstruction sensor (100) may actuate the processor (94) of the console device (10) to close the motorized entry system. The transmitter/receiver device (94) may send an alert to the external software application that the motorized entry system was closed. The data is then deleted from the memory device (92) and the transmitter/receiver (94) device may send an alert to the external software application to notify that the package corresponding to the data was delivered. In some embodiments, the transmitter/receiver (94) device is configured to communicate through Bluetooth Low Energy (BLE) and WiFi, and the data inputted into the external software device and sent to the console device (10) may be a tracking number. In some embodiments, the fixed interval of the obstruction sensor (100) checks may be every 30 to 90 seconds.

Figure 4:
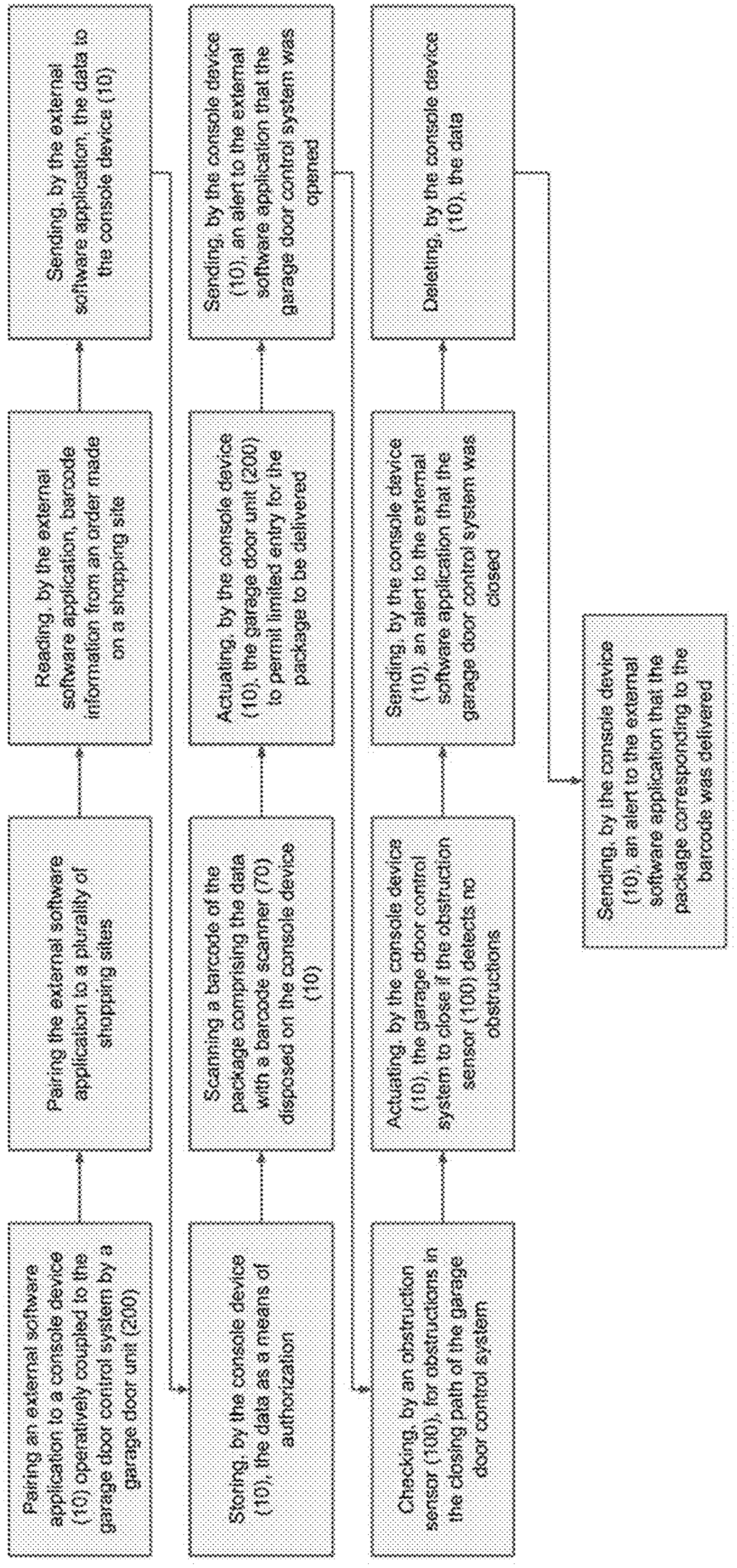
FIG. 4 shows a method of the present invention for using a console device to authorize a motorized entry system to permit entry through the use of a barcode automatically transmitted from an external software application, the external software application being linked to a plurality of shopping sites.
Figure 5A:
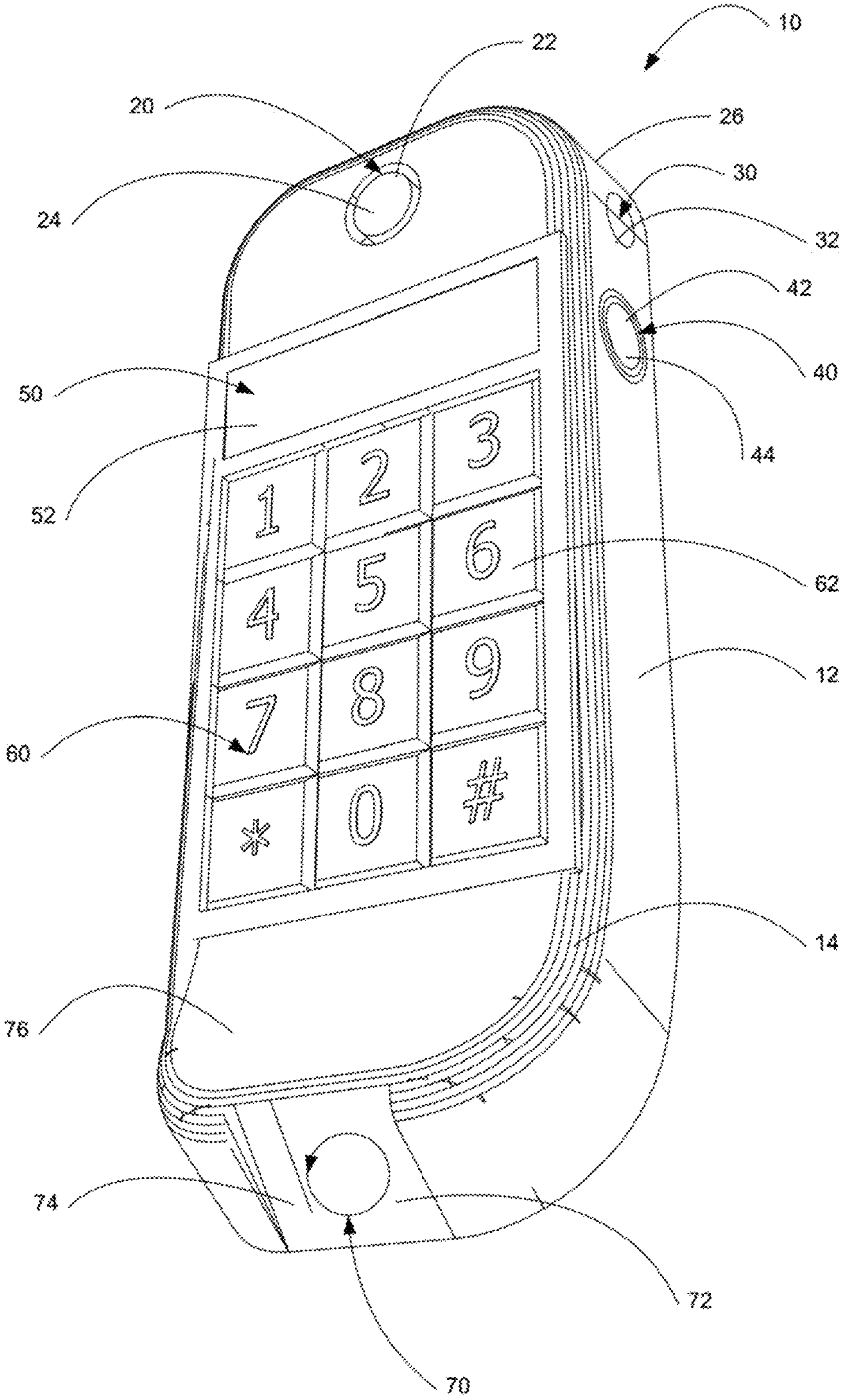
FIG. 5A shows a perspective view of an illustrative embodiment of a keyless intelligent secure wall console device of the present invention.
Figure 5B:
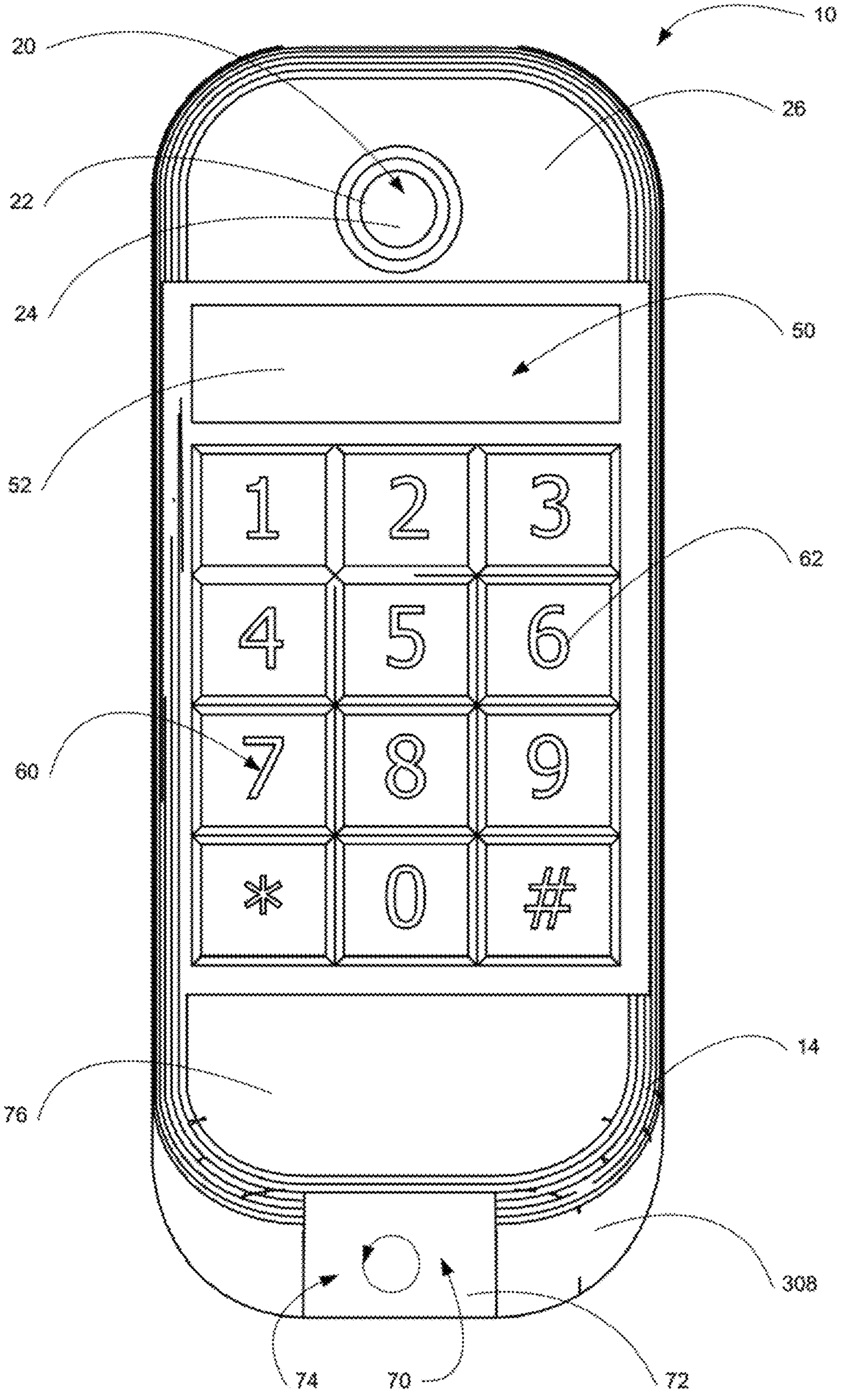
FIG. 5B shows a perspective front view of a panel of the keyless intelligent secure wall console device of the present invention.
Figure 5C:
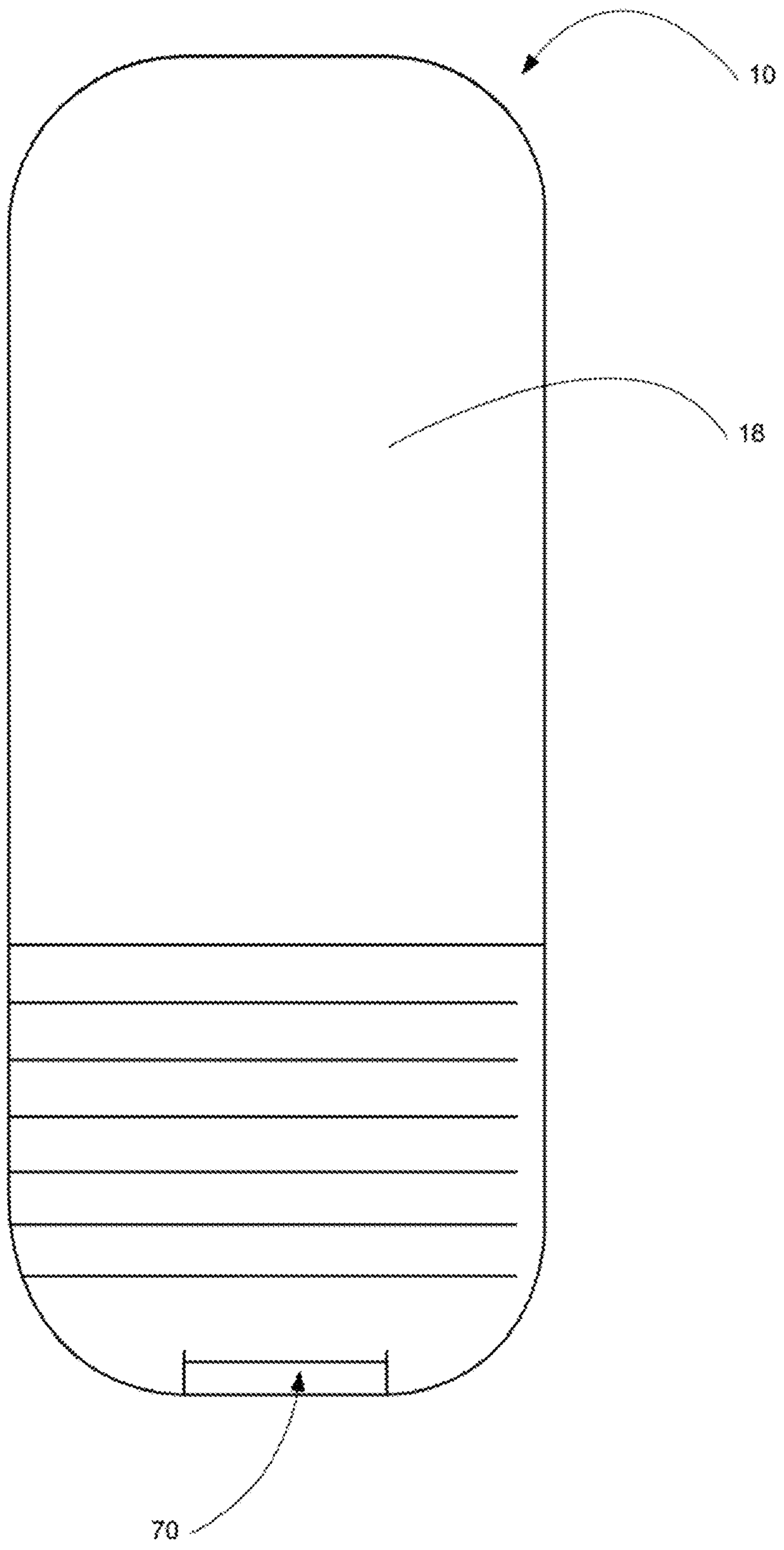
FIG. 5C shows a perspective Back view of panel of the keyless intelligent secure wall console device of the present invention.
Figure 5D:
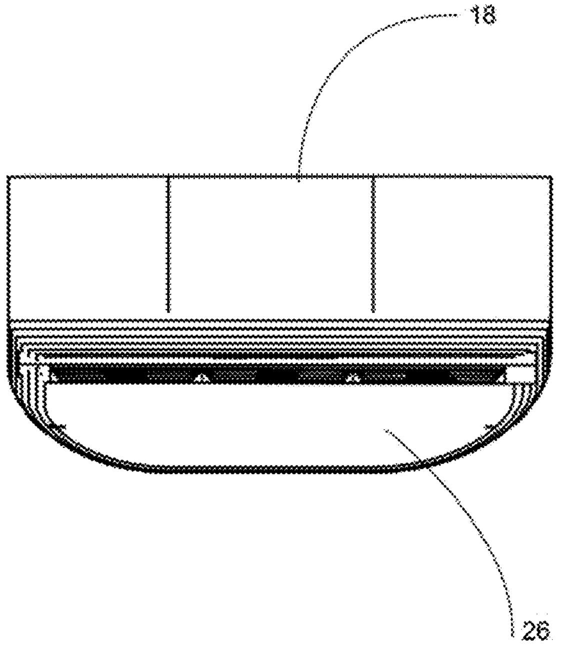
FIG. 5D shows a perspective Top view of panel of the keyless intelligent secure wall console device of the present invention.
Figure 5E:
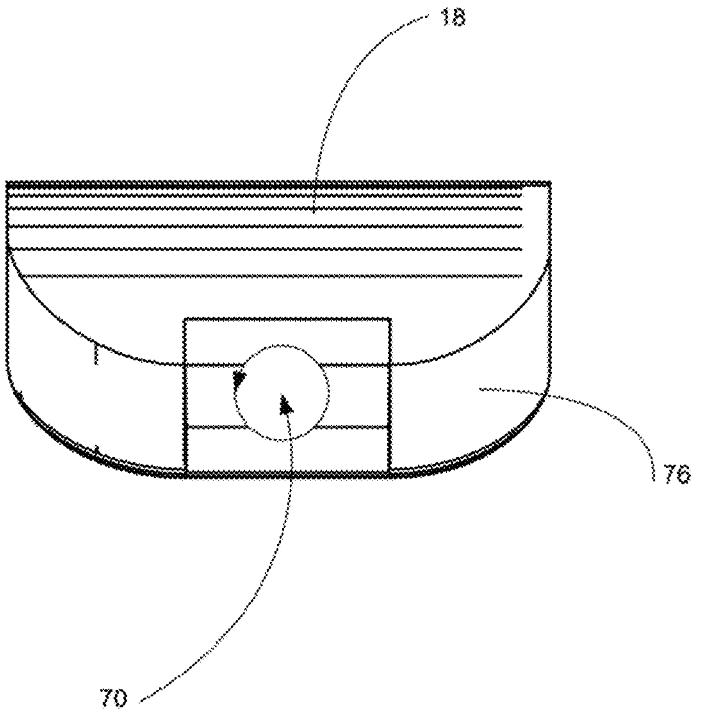
FIG. 5E shows a perspective Bottom view of panel of the keyless intelligent secure wall console device of the present invention.
Figure 5F:
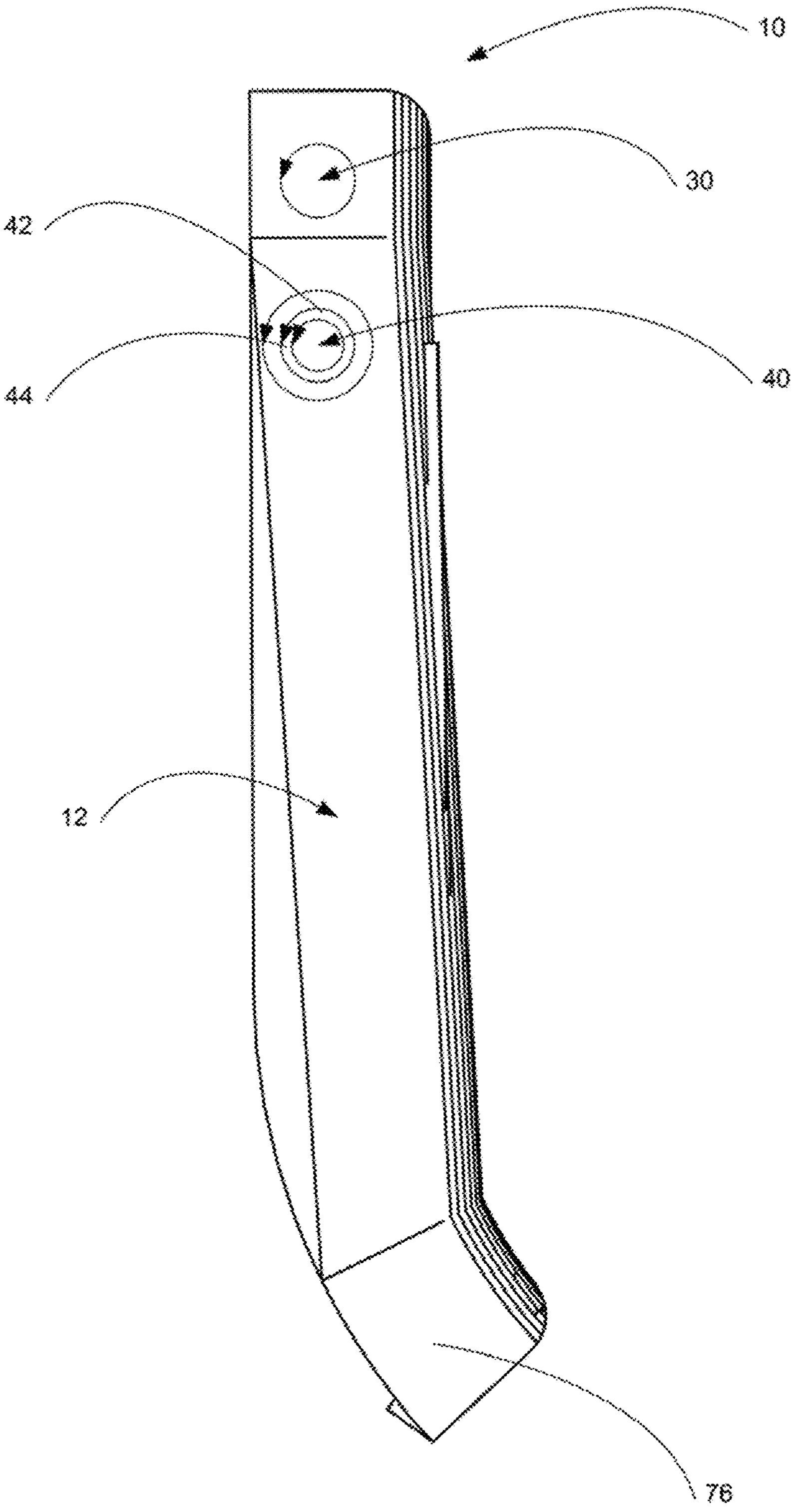
FIG. 5F shows a perspective Left side view of panel of the keyless intelligent secure wall console device of the present invention.
Figure 5G:
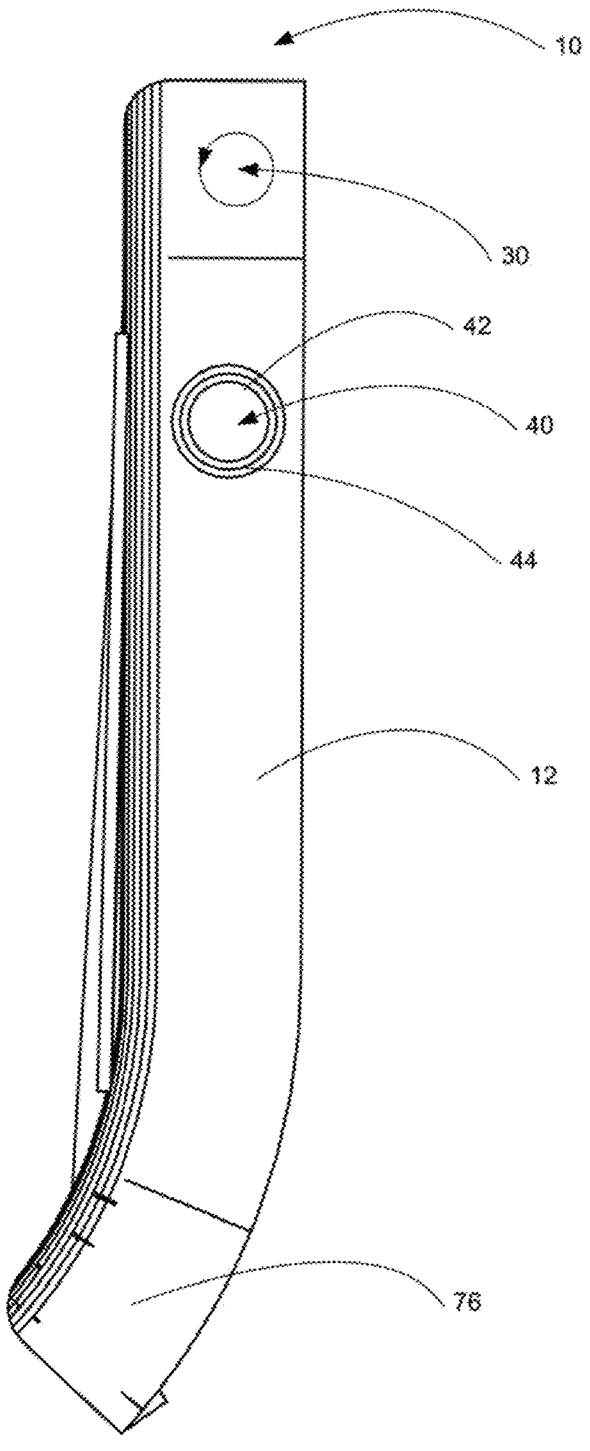
FIG. 5G shows a perspective Right-side view of panel of the keyless intelligent secure wall console device of the present invention.
Figure 5H:
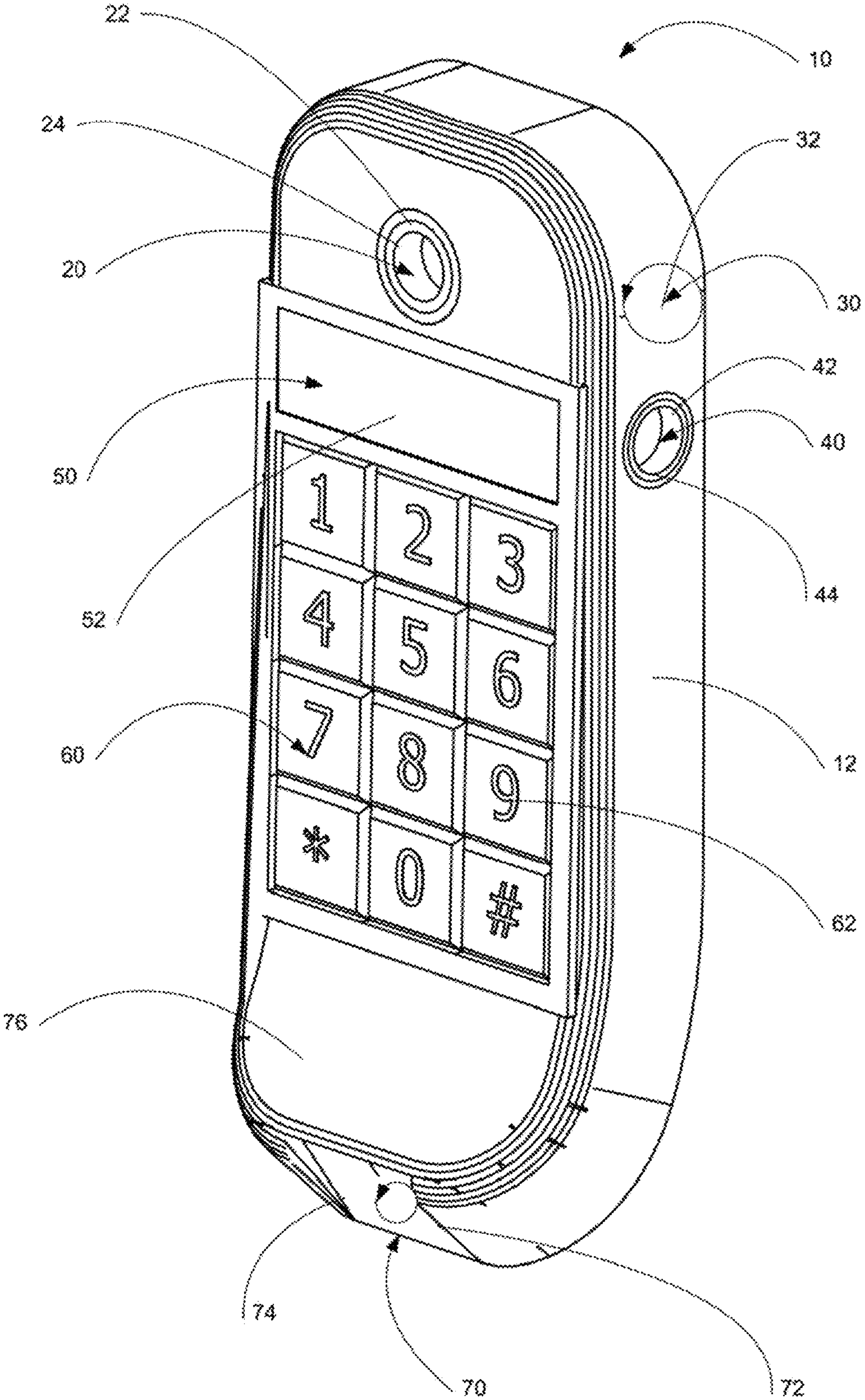
FIG. 5H shows a perspective ISO view of panel of the keyless intelligent secure wall console device of the present invention.
Figure 5I:
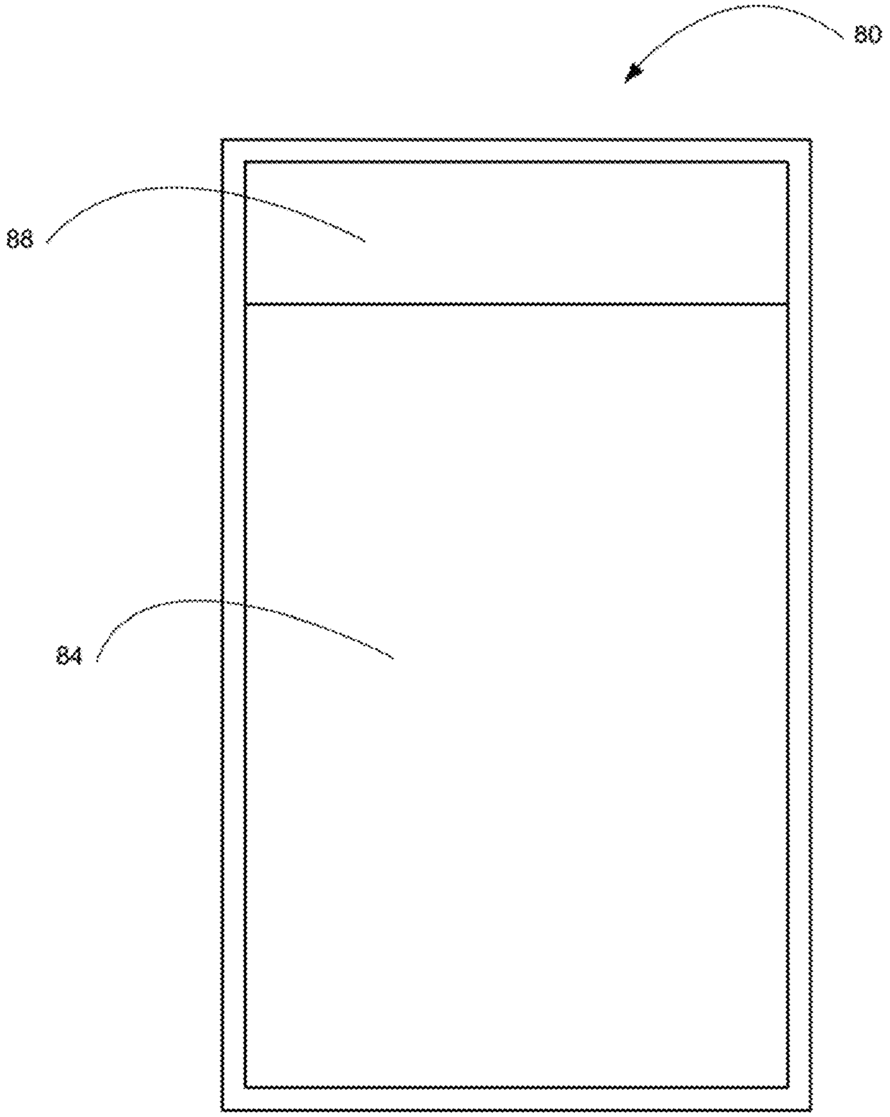
FIG. 5I shows a perspective front cover view of panel of the keyless intelligent secure wall console device of the present invention.
Figure 5J:
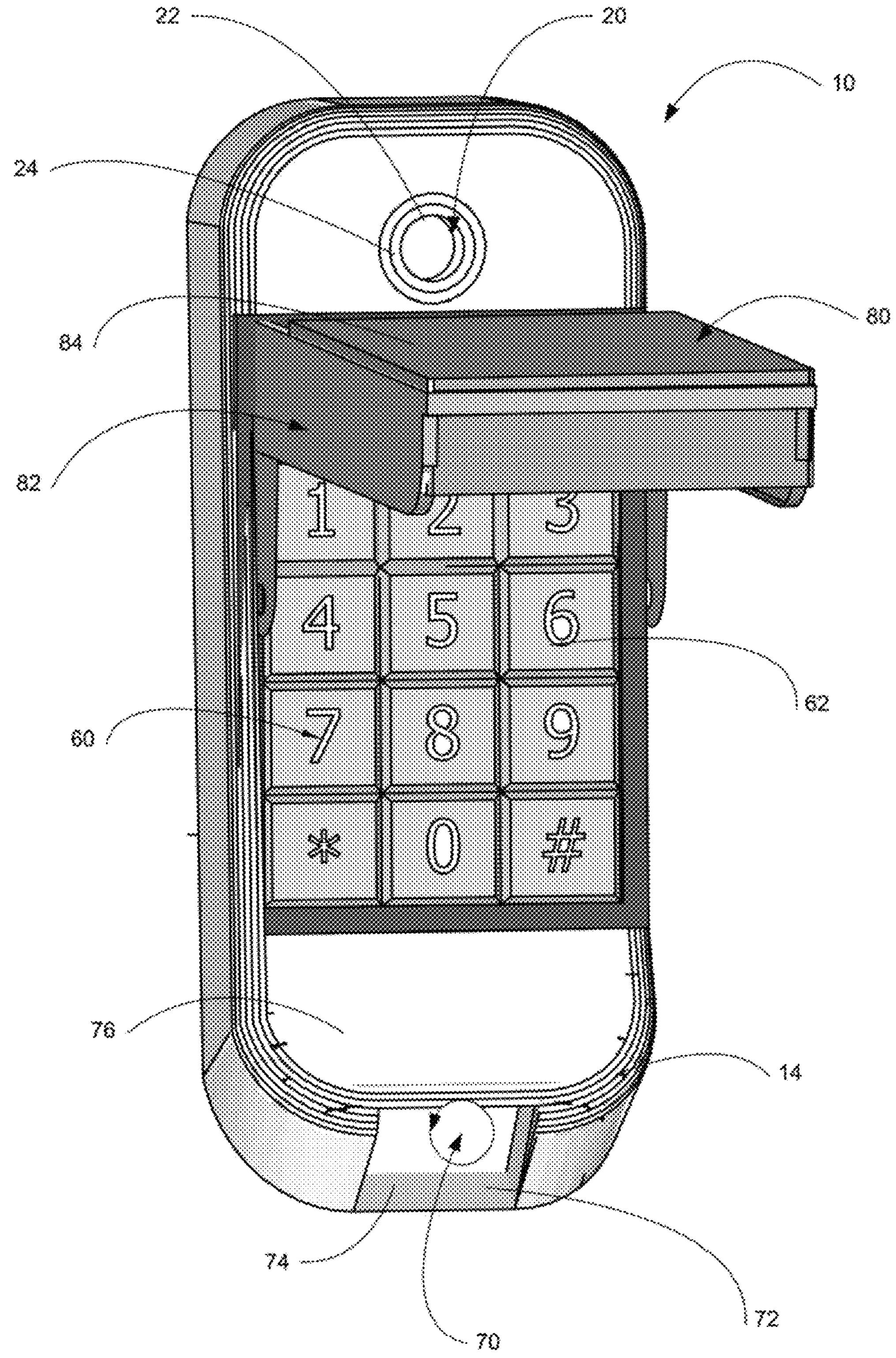
FIG. 5J shows a perspective ISO with a cover view of a panel of the keyless intelligent secure wall console device of the present invention.

Referring to FIG. 4, the present invention features a method for intelligent secure keyless authorization for package delivery for a motorized entry system through the use of an external software application. In some embodiments, the method may comprise integrating a console device (10) into a motorized entry system and communicatively coupling the external software application with the console device (10). The external software application may then be linked to a plurality of shopping sites such that data from an order made on a shopping site from the plurality of paired shopping sites is automatically uploaded to the external software application and sent to the console device (10). The data may then be stored by the console device (10). When a barcode of the package is scanned by a barcode scanner (70) disposed on the console device (10), the console device (10) checks if the scanned barcode corresponds to the data and actuates the motorized entry system to permit limited entry for the package to be delivered if a match is found. A person delivering the package may then place the package indoors. The console device (10) may send an alert to the external software application that the motorized entry system was opened.

In some embodiments, the method may further comprise an obstruction sensor (100) checking for obstructions in the closing path of the motorized entry system on a fixed interval. If a check is completed and no obstructions are detected by the obstruction sensor (100), the console device (10) may actuate the motorized entry system to close. The console device (10) may send an alert to the external software application that the motorized entry system was closed. The method may further comprise deleting the matched barcode as a means of authorization, and sending an alert to the external software application that the package corresponding to the data was delivered. In some embodiments, the console device (10) communicates with the external software application through the use of WiFi and Bluetooth Low Energy connections. In some embodiments, the data received by the console device (10) is a tracking number. In some embodiments, the fixed interval of obstruction sensor (100) checks is every 30 to 90 seconds.

Referring now to FIGS. 5A-5J, the present invention features a device (10) for intelligent secure keyless authorization for package delivery for a motorized entry system. The device (10) may comprise a weather-proof housing (12), a front camera (20), a side camera (30) on either side of the device (10), a microphone-speaker (40), an LED screen (50), a backlight keypad (60), a barcode scanner (70), and a cover (80) for the backlight keypad (60). In some embodiments, the front camera (20) may be a motion-detection facial-recognition camera. In some embodiments, the front camera (20) may be used for scanning faces as a means of authorization for the motorized entry system to permit entry. The console device (10) may store face information received from the external software application and compare scanned faces to stored faces as a means of authorization. In other embodiments, the front camera (20) may be used for conference calls between the console device (10) and the external software application. The microphone-speaker (40) may be used to transmit and receive audio, and the front camera (20) may be used to transmit video. In other embodiments still, the front camera (20) may be used for security through the use of motion detection. The front camera (20) may take pictures when motion is detected and send an alert to the external software application.

In some embodiments, the side camera(s) (30) may also be used for security through the use of motion detection through the same method as the front camera (20). The microphone-speaker (40) may be used to detect noises above a certain threshold and send an alert to the external software application if one such noise is detected. In some embodiments, the LED screen (50) may be used to display information relevant to a user of the console device (10). The displayed information may comprise error codes if an error in the motorized entry system or the console device (10) is detected, directions for initializing PIN authorization, directions for authorizing based on facial recognition, directions for authorizing based on barcode scanning, and the state that the console device (10) is currently in (security, default, etc), In some embodiments, the backlight keypad (60) may comprise digit keys (0-9) and an ENTER key. In some embodiments, the digit keys may be used to initialize PIN authorization from the console device (10). The ENTER key may be used to confirm PIN authorization and select an option. In some embodiments, the barcode scanner (70) may be used to scan barcodes of packages as a means of authorization for the console device (10). In some embodiments, the cover (80) may comprise a solar cell (82) that may generate a DC current to charge the console device (10) when the cover (80) is in a closed position in order to keep the console device (10) fully charged without requiring the batteries to be changed.

An external software application may be installed onto a computing device (laptop, desktop computer, mobile phone, etc) and communicatively coupled to a console device (10) integrated into a motorized entry system. The computing device may connect to a home network and the console device (10) may connect to the same home network. The external software application may use the home network to communicate with the external software application and vice-versa. The external software application may comprise an option to set at least one PIN as a method of authorization for the console device (10) by accepting at least one PIN as input from a user and transmitting the entered PIN(s) to the console device (10). The external software application may further comprise an option to set a face as a method of authorization by scanning the user's face and sending facial recognition information to the console device (10). The external software application may further comprise an option to directly authorize the console device (10) to actuate the motorized entry system and permit entry. The external software application may further comprise an option to set a barcode of a package as a method of authorization for the console device (10) by accepting tracking numbers from the user as input and transmitting the tracking numbers to the console device (10). The external software application may further comprise links to a plurality of shopping sites, wherein tracking numbers of orders made on a shopping site of the plurality of shopping sites are automatically read by the external software application and transmitted to the console device (10) as a means of authorization.

The present invention may be directed to a method for intelligent secure keyless authorization for package delivery for a garage door control system. In some embodiments, the method may comprise pairing an external software application to a console device (10) operatively coupled to the garage door control system by a garage door unit (200) through a communicative connection. The method may further comprise entering data associated with a package to be delivered into the external software application as a means of authorization, sending, by the external software application, the data to the console device (10), and storing, by the console device (10), the data as the means of authorization. The method may further comprise scanning the package's barcode with a barcode scanner (70) disposed on the console device (10). In some embodiments, the barcode may comprise the data. The method may further comprise actuating, by the console device (10), the garage door unit (200) to permit limited entry for the package to be delivered. In some embodiments, the limited entry may comprise partially opening a garage door of the garage door control system to allow only the package to pass under the garage door.

The method may further comprise sending, by the console device, an alert to the external software application that the garage door control system was opened. The method may further comprise checking, by an obstruction sensor (100) communicatively coupled to the console device (10), for obstructions in the closing path of the garage door control system on a fixed interval. The method may further comprise actuating, by the console device (10), the garage door control system to close if the obstruction sensor (100) detects no obstructions while checking. The method may further comprise sending, by the console device (10), an alert to the external software application that the garage door control system was closed, deleting, by the console device (10), the data, and sending, by the console device (10), an alert to the external software application that the package corresponding to the barcode was delivered. If the barcode of the package does not comprise the data, the garage door control system may not be actuated. In some embodiments, the console device (10) may communicate with the external software application through the use of WiFi and Bluetooth Low Energy connections. The data may be a tracking number. The fixed interval may be 30 to 90 seconds.

The present invention features a system for intelligent secure keyless authorization for package delivery for a garage door control system through the use of an external software application. In some embodiments, the system may comprise a console device (10)/The console device may comprise an LED screen (50), a backlight keypad (60), a barcode scanner (70), a processor (90), a RAM device (96), a memory device (92), and a transmitter/receiver device (94). In some embodiments, the memory device (92) may store data and computer-readable instructions for comparing a barcode to data and actuating a garage door control system. The processor (90) may execute computer-readable instructions stored in the memory device (92). The transmitter/receiver device (94) may communicate with a home network and may communicate with the external software application through the home network. The system may further comprise an obstruction sensor (100) communicatively coupled to the console device (10) and a garage door unit (200) operatively coupled to the garage door control system and the console device (100).

In some embodiments, the console device (10) may be integrated into the garage door control system. The console device (10) may be coupled communicatively to the external software application and the console device (10) may be coupled communicatively to the obstruction sensor (100). The transmitter/receiver device (94) may accept a data of a package from the external software application and may communicate with the memory device (82) to store the data. The barcode scanner (70) may scan a barcode from a package and transmit the scanned barcode information to the processor (90). The processor (90) may accept barcode information from the barcode scanner (72) and may execute computer-readable instructions stored in the memory device (92) to compare the scanned barcode information to the data (92). If the scanned barcode information corresponds to the data, the processor may execute computer-readable instructions to actuate the garage door control system to permit entry. The transmitter/receiver (94) device may send a notification to the external software application that the garage door control system has opened. If the garage door control system is open, the obstructions sensor (100) may scan for obstructions in a closing path of the garage door control system at a fixed interval. If no obstructions are detected in the closing path, the obstruction sensor (100) may actuate the console device (10) to actuate the garage door control system to close. The transmitter/receiver (94) device may send a notification to the external software application that the garage door control system was closed. The data may be deleted from the memory device (92) after being used to authorize entry and the transmitter/receiver (94) device may send a notification to the external software application that the package corresponding to the matched barcode was delivered. In some embodiments, the console device (10) may communicate with the external software application through the use of WiFi and Bluetooth Low Energy connections. The data may be a tracking number. The fixed interval may be 30 to 90 seconds.

The present invention may feature a method for intelligent secure keyless authorization for package delivery for a garage door control system. In some embodiments, the method may comprise pairing an external software application to a console device (10) operatively coupled to the garage door control system by a garage door unit (200) through a communicative connection. The garage door control system may have a receiver disposed within to allow for the communicative connection. In some embodiments, the garage door unit (200) acts as the receiver for commands from the console device (10). The receiver may communicate via an RF or Bluetooth signal. In some embodiments, the receiver may comprise a Relay RF, a Bluetooth emitter/receiver, or a combination thereof. In some embodiments, the receiver may comprise an Ultrasonic Module HC-SR04 Distance Measuring Ranging Transducers Sensor with camera. The method may further comprise pairing the external software application to a plurality of shopping sites, reading, by the external software application, barcode information from an order made on a shopping site from the plurality of paired shopping sites, sending, by the external software application, the data to the console device (10), storing, by the console device (10), the data as a means of authorization, and scanning a barcode of the package may comprise the data with a barcode scanner (70) disposed on the console device (10). The method may further comprise actuating, by the console device (10), the garage door unit (200) to permit limited entry for the package to be delivered. The limited entry may comprise partially opening a garage door of the garage door control system to allow only the package to pass under the garage door.

The method may further comprise sending, by the console device (10), an alert to the external software application that the garage door control system was opened, checking, by an obstruction sensor (100), for obstructions in the closing path of the garage door control system on a fixed interval, and actuating, by the console device (10), the garage door control system to close if the obstruction sensor (100) detects no obstructions while checking. The method may further comprise sending, by the console device (10), an alert to the external software application that the garage door control system was closed, deleting, by the console device (10), the data, and sending, by the console device (10), an alert to the external software application that the package corresponding to the barcode was delivered. If the barcode of the package does not comprise the data, the garage door control system may not be actuated. In some embodiments, the console device (10) may communicate with the external software application through the use of WiFi and Bluetooth Low Energy connections. The data may be a tracking number. The fixed interval may be 30 to 90 seconds.

In some embodiments, the present invention may be capable of generating a one-time code for a user to use to actuate the garage door control system. This one-time code may be generated by the pin pad of the console device or the external software application. Upon entering the one-time code into the console device, the camera may take a picture capturing the face of the person entering the code. This picture may be sent to the external software application for the user to confirm the identity of the user. Upon successfully entering the one-time code, the code may be discarded and no longer be available as a means of authorization. In some-embodiments, the console device (10) may be the only method of opening the garage door control system. In some embodiments, the console device (10) may be capable of accepting as a means of authorization a numeric code, a password, an authorized facial identification scan, an authorized fingerprint, or a combination thereof.

In some embodiments, the console device (10) may be operatively connected to the garage door unit (200) by a WiFi connection. If a WiFi connection is unavailable, the console device (10) may be operatively connected to the garage door unit (200) by an RF connection. The garage door unit (200) may comprise a storage component for storing data. The storage component may be an SD card. In the case of a WiFi connection being unavailable, and thus disconnecting the console device (10) from the external software application, the console device (10) may transmit data (i.e. barcodes, photos, biometrics, etc.) to the garage door unit (200) by the RF connection to be stored in the storage component. When a WiFi connection becomes available again, all data stored in the storage component may be synced to the external software application. This allows for the present invention to operate with no downtime or interruptions even in the case of an Internet outage. Because of this, the RF connection is considered more reliable and secured than the WiFi connection.

In some embodiments, the memory component of the control device (10) may be capable of executing, by a camera (20), a facial identification scan. This may involve taking an initial photograph of one or more faces, processing the one or more faces into data to be used as one or more means of authorization, taking a second photograph of a face, processing the face into data, and comparing the data to the registered means of authorization. If the face matches, then the garage door unit (200) may actuate the garage door control system and the external software application may be notified. The facial recognition is to allow family members and especially the kids access to the property without keys, since kids most likely will misplace the keys or lose them, the notification system will give the parents the peace of mind that the kids arrived home and are at home safe. If the face does not match, then the garage door will not be opened and the external software application may be notified. This may allow for the user to report the authorities of a potential intruder that tried to enter the premises with a picture of the culprit.

In some embodiments, the present invention may obviate the need for a garage door opener in the car as well as the need to program the rear view mirror to open the garage. The external software application and the console device (10) are capable of actuating the garage door control system and opening the garage door on its own. This prevents thieves from gaining access to homes through the garage by using a garage door clicker left in the car or by using the rear view mirror even when the car is not running.

In some embodiments, the console device (10) may use the camera (20) to take a picture while a barcode is being scanned as a package is being delivered. This picture may include a face of the delivery person delivering the package. This picture may then be sent from the console device (10) to the external software application for review by the user. If anything happens to the package (e.g. it is not delivered, the package is damaged, etc.), they will be able to identify the delivery person responsible for the package and notify the source of the package or the delivery service of who should be held accountable.

In some embodiments, the camera (20) may detect a person approaching the console device (10) and initiate communication with the external software application. This communication may comprise audio communication (by the microphone-speaker (40)) or audio-video communication (by the microphone-speaker (40) and the camera (20)). This may allow for the user to confront potential intruders or unwanted individuals to scare them off, or to identify a known visitor without needing to go to the door.

Figure 6:
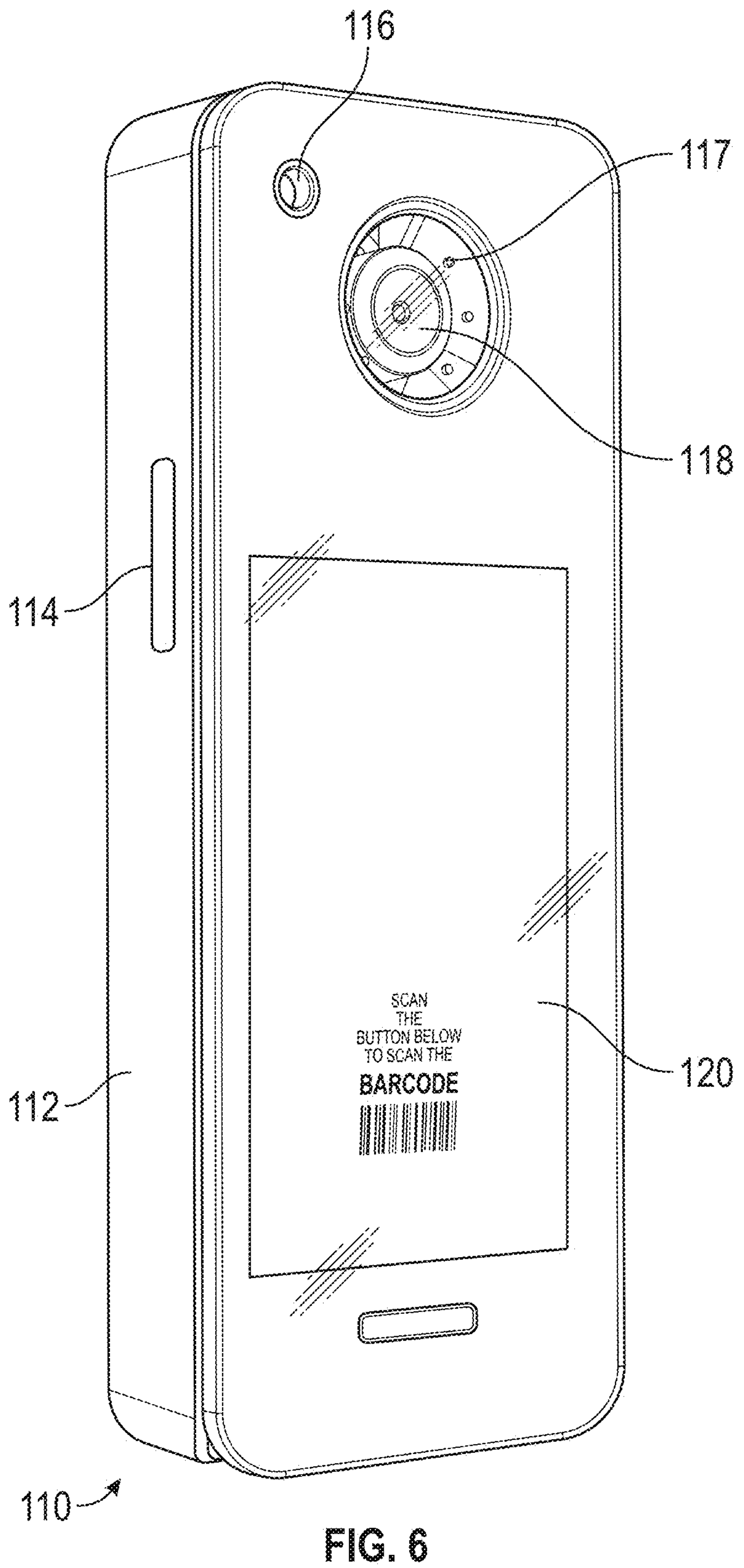
FIG. 6 shows a perspective view of another illustrative embodiment of a keyless intelligent secure wall console device of the present invention.
Figure 7:
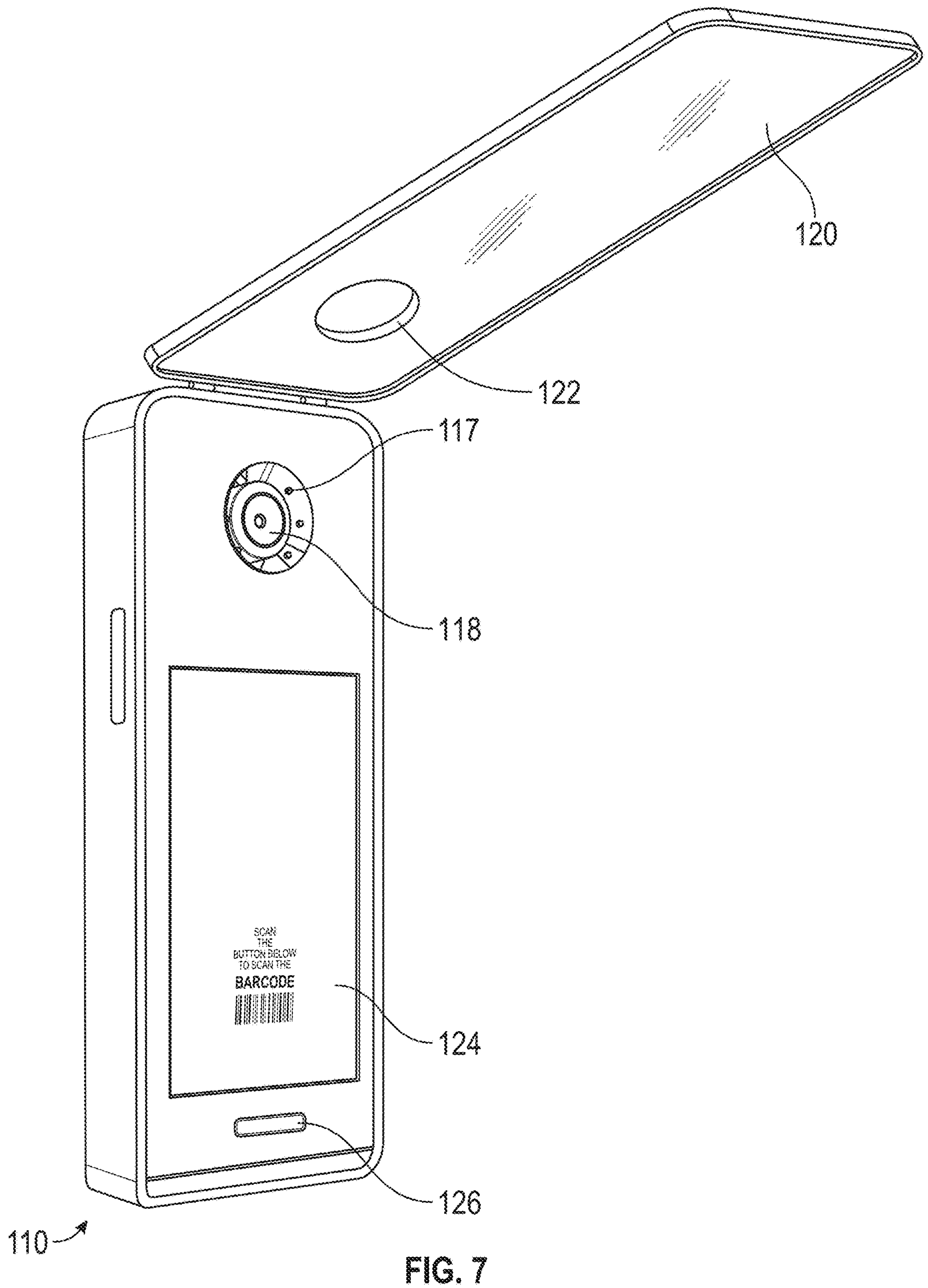
FIG. 7 shows another perspective view of the keyless intelligent secure wall console device of FIG. 6, wherein the cover of the device has been rotated into an open position.
Figure 8:
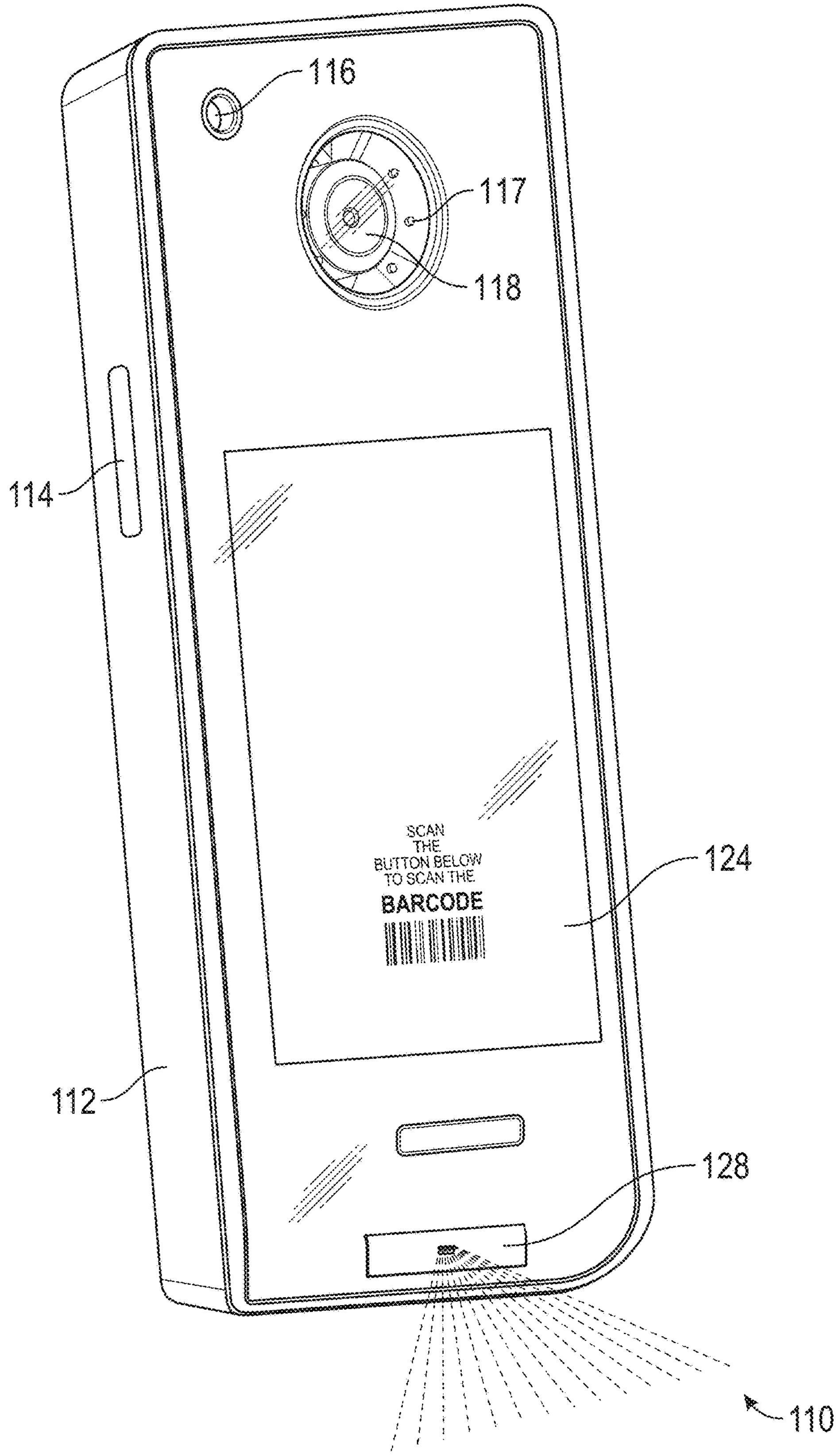
FIG. 8 shows yet another perspective view of the keyless intelligent secure wall console device of FIG. 6, wherein the barcode scanner of the device is shown in operation.

Referring now to FIGS. 6-8, another illustrative embodiment of a console device (110) of the present intelligent secure keyless entry system is depicted. The device (110) may comprise a weather-proof housing (112), one or more microphone-speakers (114), a motion sensor (116), a night vision light-emitting diodes (117), a camera (118), a rotatable cover (120), a touchscreen (124) for information input and setup, a pushbutton (126), and a barcode scanner (128). In some embodiments, the camera (118) may be a motion-detection facial-recognition camera. In some embodiments, the camera (118) may be used for scanning faces as a means of authorization for the motorized entry system to permit entry. The console device (110) may store face information received from the external software application and compare scanned faces to stored faces as a means of authorization. The facial recognition feature helps to store facial data of the owner's close relatives and friends, thereby allowing access of family and friends so that they can enter hassle-free. In other embodiments, the camera (118) may be used for conference calls between the console device (110) and the external software application. The microphone-speaker (114) may be used to transmit and receive audio, and the camera (118) may be used to transmit video. In other embodiments still, the camera (118) may be used for security through the use of motion detection. The camera (118) may take pictures when motion is detected and send an alert to the external software application. The console device (110) may also have night vision motion detection. The console device (110) may further include a microprocessor with storage Wi-Fi, RF, and Bluetooth connectivity. The push-button (126) may enable the push-to-talk functionality of the console device (110).

In some embodiments, the rotatable cover (120) of the console device (110) may be formed from a hard, thick, and durable glass (e.g., having a 9H hardness). The rotatable cover (120) may be in a form of a high quality ultraviolet (UV) glass cover with at least an aperture (122) for the camera (118). The motion detector 116 in the upper left hand corner of the console device (110) may have a range up to 10 meters. The camera (118), which is centered below motion detector (116), may comprise a high-definition ultra wide angle camera (e.g., with a field of view of between 120 degrees and 170 degrees, inclusive) to ensure full surveillance and perimeter security in front of a home. Also, as shown in FIG. 6, infrared LED lights (117) may be provided around the camera (118) for night vision, and may have a range up to 10 meters. For example, the night vision feature may utilize high-grade IR LEDs for clear night vision even under low light conditions or during power outages. In some embodiments, the console device (110) may be provided with twin microphone-speakers (114) on both sides of housing (112). Each microphone-speaker (114) may be a 5-watt speaker in some embodiments. Referring to FIGS. 7 and 8, the console device (110) may be provided with a full color touchscreen (124). For example, the touchscreen (124) may be in a form of a 4.5 inch LCD touchscreen capable of at least 480×272 pixels). The touchscreen (124) enables a virtual keypad to be displayed to the user of the device (110). The console device (110) may be provided with a push button (126) below touchscreen (124) for allow a user to talk into the device (110). For example, the push button (126) may have a metal design with an oleophobic coating. The touchscreen (124) may allow temporary access to a vital service provider for inspection or repair in the garage, while the console device (110) also may enable 2-way communication, and allow the user to leave delivery instructions if special handling is required.

Figure 10:
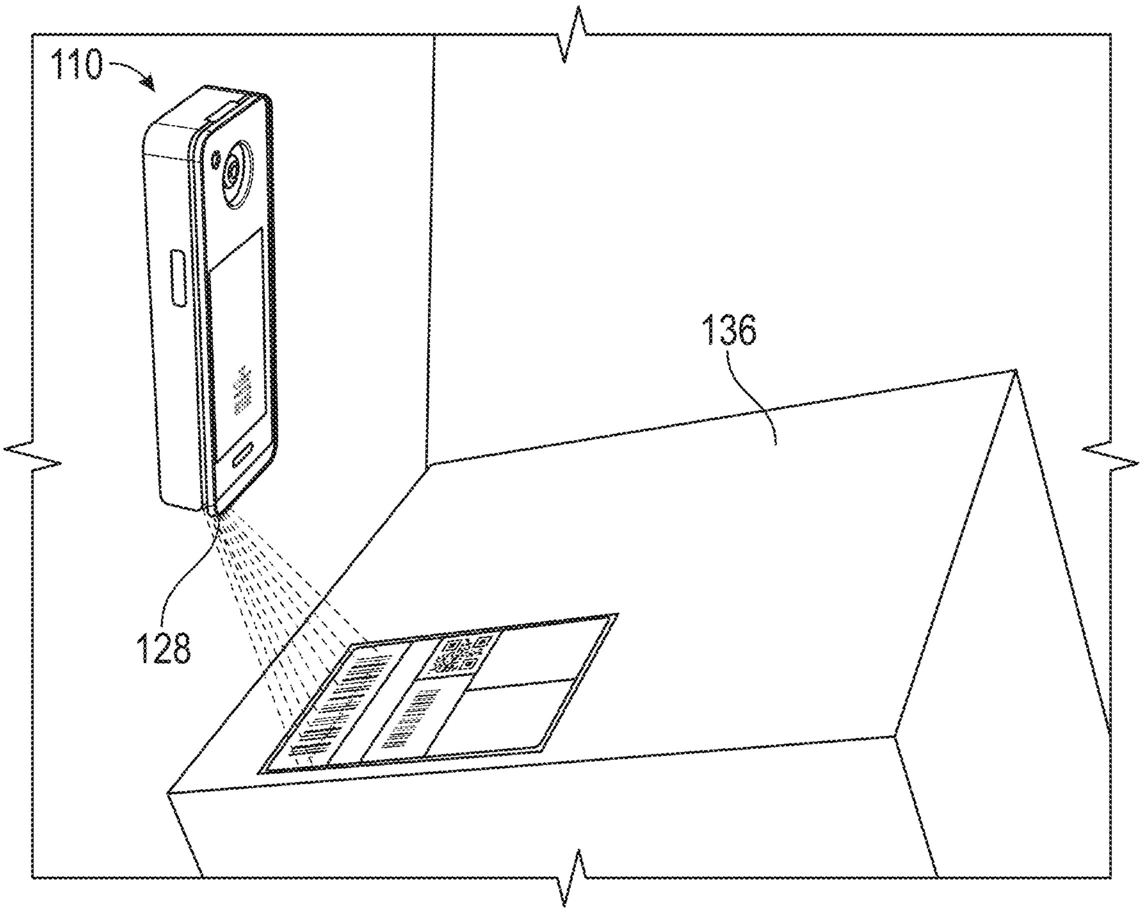
FIG. 10 shows a perspective view depicting the keyless intelligent secure wall console device of FIG. 6 being used to scan a barcode of a package.

With reference again to FIGS. 8 and 10, it can be seen that, in the illustrative embodiment, the console device (110) further includes a barcode scanner (128) on the bottom of housing (112) for scanning the barcode of a package (136) in the manner described above. For example, the barcode scanner (128) may comprise a high precision laser with a 51-250 mm range. In some embodiments, when motion is detected by the motion sensor (116) near the device, the barcode scanner (128) will be automatically activated. Once the barcode is approved, the garage door will open, and a notification will be sent to the owner's smartphone, a picture of the delivery person captured by the camera on the transmitter also may be sent in the notification to the owner's smartphone.

In addition to the components described above, the console device (110) may further comprise a detachable battery that is easy to replace without any hassle, and is removable from the housing (112) by removing the back cover of the housing (112). Also, console device (110) may have MicroSD card support and cloud storage capabilities, and enable a live video feed accessible from anywhere through the internet.

Figure 9:
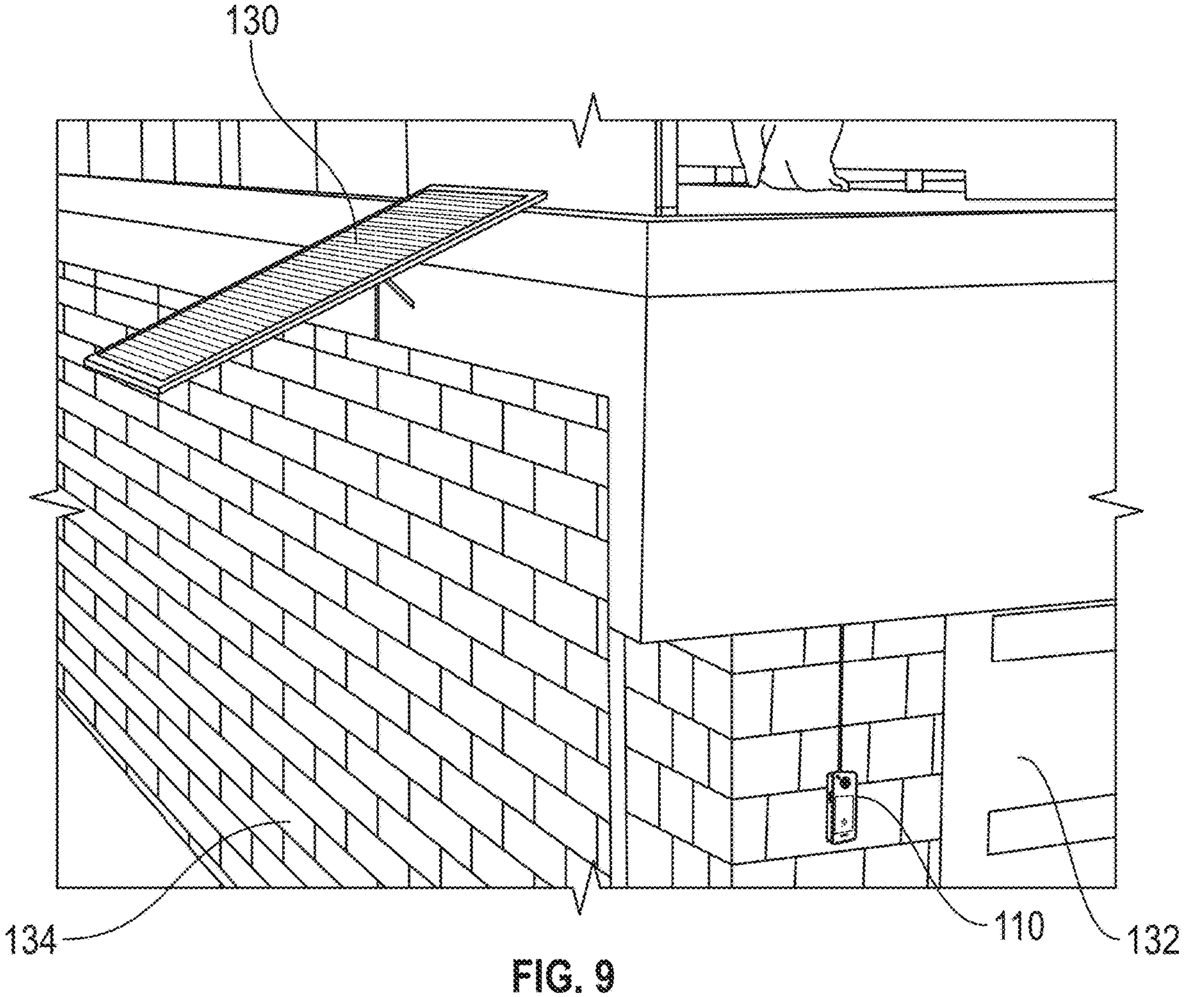
FIG. 9 shows a perspective view depicting the keyless intelligent secure wall console device of FIG. 6 disposed next to a garage door, and powered by a remote solar panel.

An exemplary system installation is depicted in FIG. 9. As shown in this figure, the console device (110) may be mounted on the wall of a dwelling (134), next to a garage door (132). The console device (110) may be operatively coupled (e.g., by electrical wiring) to a remote solar panel (130) mounted on the dwelling (134). The remote solar panel (130) may provide power for the console device (110). Advantageously, the solar panel (130) enables device (110) to run without a power grid-based power supply. The solar panel (130) can be installed anywhere facing sun, and is wired to the transmitter console device (110). The battery of the console device (110) may be electrically connected to the solar panel (130) to keep the unit and the battery charged. The console device (110) may further comprise a USB connection to allow the unit to be charged from the home power if the weather is not cooperating.

In some embodiments, a smartphone can be used to activate garage door (132) by pressing a virtual button on the touchscreen of the smartphone. In these embodiments, no garage door clicker is needed, as the user can simply use his or her smartphone to open the garage door (132) through a garage door software application ("app").

Figure 11:
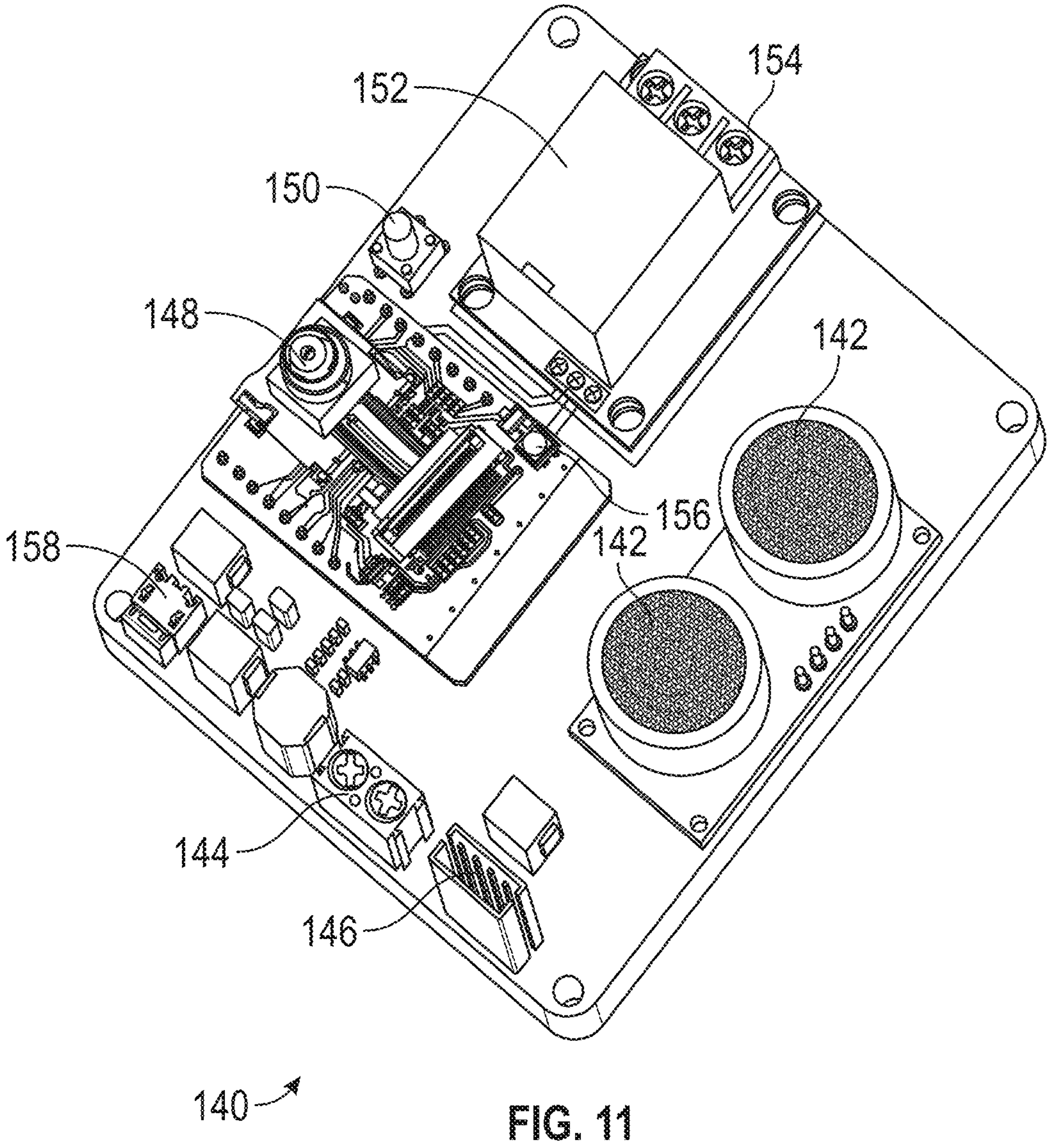
FIG. 11 shows a perspective view of an illustrative embodiment of a receiver unit control board of the present invention.

With reference now to FIG. 11, an illustrative embodiment of a receiver unit control board (140) of the present intelligent secure keyless entry system is depicted. The receiver unit control board (140) may be mounted inside the garage on, or proximate to, the garage door opener. As shown in FIG. 11, the receiver unit control board (140) may comprise an ultrasonic module distance sensor (142), an AC input (144), programming jumpers (146), a wide-angle camera module (148), a PIR motion detector (150) to allow the sensing of motion inside the garage, a relay module (152) to assist with opening and closing the garage door, connectors (154), a light-emitting diode (156), and a USB connector (158) to plug into the home power supply. With the camera (148) on the receiver unit control board (140), the system is able to monitor delivery personnel inside the garage during an attempted delivery. Similar to the console device (110), the receiver unit control board (140) may further include a microcontroller with a Wi-Fi, Bluetooth, and RF connection.

In some embodiments, the intelligent secure keyless entry system comprises the transmitter console device (110) and a receiver unit with the control board (140) of FIG. 11. In these embodiments, the transmitter console device (110) may be installed on the outside of the garage, preferably on the front next to the garage door. The receiver unit may be installed inside the garage next to the garage motor. Both the transmitter console device (110) and the receiver unit may be connected to the home network with their own internet protocol (IP) connections. Also, both the transmitter console device (110) and the receiver unit may connect to mobile devices and be integrated with all mobile connections.

It is readily apparent that the aforedescribed illustrative intelligent secure keyless entry system offers numerous advantages and benefits. These exemplary benefits include, but are not limited to, the following: (i) secure delivery of packages, (ii) porch thieves are prevented from stealing your purchases, (iii) eliminating the need to run to the Post Office or any other shipper's facility to retrieve your packages, (iv) allowing the delivery of perishable medicine into the inside for refrigerated indoor areas, (v) obviating the need for a garage door clicker, (vi) obviating the need for programming the rearview mirror in a car, (vii) saving time and money for shippers, retailers, and consumers, (viii) saving on carbon emissions, and (ix) providing total access of the stored data any time anywhere.

Any of the features or attributes of the above described embodiments and variations can be used in combination with any of the other features and attributes of the above described embodiments and variations as desired.

Although there has been shown and described illustrative embodiments of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

Any reference numbers recited in the below claims are solely for ease of examination of this patent application, and are exemplary, and are not intended in any way to limit the scope of the claims to the particular features having the corresponding reference numbers in the drawings.

The invention claimed is:

1. A system for intelligent secure keyless authorization for package delivery for a garage door control system through the use of an external software application, the system comprising:

a. a console device, the console device comprising:
   i. a screen,
   ii. a barcode scanner,
   iii. a processor,
   iv. a RAM device,
   v. a memory device,
   vi. a transmitter/receiver device,
   vii. a motion sensor,
   viii. at least one camera, and
   ix. a housing,
      wherein the screen, the barcode scanner, and the at least one camera are at least partially circumscribed by the housing of the console device,
      wherein the memory device stores data and computer-readable instructions for comparing a barcode to a data and actuating a garage door control system,
      wherein the processor executes computer-readable instructions stored in the memory device,
      wherein the transmitter/receiver device communicates with a home network, and
      wherein the transmitter/receiver device communicates with the external software application through the home network; and b. a garage door unit comprising a storage component operatively coupled to the garage door control system and the console device, the garage door unit configured to be mounted inside a garage on, or proximate to, a garage door opener;

wherein the console device is configured to be connected to the garage door unit by a wireless connection;

wherein the console device is integrated into the garage door control system;

wherein the console device is coupled communicatively to the external software application;

wherein the transmitter/receiver device accepts a data of a package from the external software application;

wherein the transmitter/receiver device communicates with the memory device to store the data;

wherein, when motion is detected by the motion sensor near the console device, the barcode scanner is automatically activated;

wherein the barcode scanner scans a barcode from a package and transmits the scanned barcode information to the processor, the barcode scanner scanning the barcode directly without taking a picture of the barcode using a camera and then parsing the picture for determining the barcode;

wherein the processor accepts barcode information from the barcode scanner and executes computer-readable instructions stored in the memory device to compare the scanned barcode information to the data;

wherein the processor, if the scanned barcode information corresponds to the data, executes computer-readable instructions to actuate the garage door control system to permit entry;

wherein the transmitter/receiver device sends a notification to the external software application that the garage door control system has opened;

wherein the transmitter/receiver device sends a notification to the external software application when the garage door control system is closed; and wherein the transmitter/receiver device sends a notification to the external software application that the package corresponding to the matched barcode was delivered.

2. The system of claim 1, wherein the transmitter/receiver device is a radiofrequency transmitter/receiver configured to communicate through the use of WiFi and Bluetooth Low Energy connections.

3. The system of claim 1, wherein the data is a tracking number.

4. The system of claim 1, wherein the garage door control system can only be actuated by the console device.

5. The system of claim 1, wherein the console device is capable of accepting as a further means of authorization a numeric code, a password, an authorized facial identification scan, an authorized fingerprint, or a combination thereof.

6. The system of claim 1, wherein the housing of the console device further comprises a displaceable cover, the displaceable cover being moveable between an open position and a closed position, and at least a portion of the displaceable cover being disposed between the barcode scanner and the at least one camera.

7. The system of claim 1, further comprising a solar cell operatively coupled to the console device, the solar cell configured to generate power to charge the console device.

8. The system of claim 1, further comprising an obstruction sensor communicatively coupled to the console device; and wherein the obstruction sensor, if the garage door control system is open, scans for obstructions in a closing path of the garage door control system on a fixed interval; and wherein the obstruction sensor, if no obstructions are detected in the closing path, actuates the console device to actuate the garage door control system to close.

9. The system of claim 1, wherein the garage door unit comprises a camera.

10. The system of claim 1, wherein the garage door unit comprises a distance sensor.

11. A system for intelligent secure keyless authorization for package delivery for a garage door control system through the use of an external software application, the system comprising:

a. a console device, the console device comprising:
   - i. a screen,
   - ii. a barcode scanner,
   - iii. a processor,
   - iv. a RAM device,
   - v. a memory device,
   - vi. a transmitter/receiver device,
   - vii. at least one camera, and
   - viii. a housing with a displaceable cover, wherein the screen, the barcode scanner, and the at least one camera are at least partially circumscribed by the housing of the console device, the displaceable cover is moveable between an open position and a closed position, and at least a portion of the displaceable cover is disposed between the barcode scanner and the at least one camera, wherein the memory device stores data and computer-readable instructions for comparing a barcode to a data and actuating a garage door control system, wherein the processor executes computer-readable instructions stored in the memory device, wherein the transmitter/receiver device communicates with a home network, and wherein the transmitter/receiver device communicates with the external software application through the home network; and b. a garage door unit comprising a storage component operatively coupled to the garage door control system and the console device, the garage door unit configured to be mounted inside a garage on, or proximate to, a garage door opener;

wherein the console device is integrated into the garage door control system;

wherein the console device is coupled communicatively to the external software application;

wherein the external software application is configured to set a face as a means of authorization for actuating the garage door control system by scanning a user's face using the at least one camera, and sending facial recognition information to the console device;

wherein the transmitter/receiver device accepts a data of a package from the external software application;

wherein the transmitter/receiver device communicates with the memory device to store the data;

wherein the barcode scanner scans a barcode from a package and transmits the scanned barcode information to the processor, the barcode scanner scanning the barcode directly without taking a picture of the barcode using a camera and then parsing the picture for determining the barcode;

wherein the processor accepts barcode information from the barcode scanner and executes computer-readable instructions stored in the memory device to compare the scanned barcode information to the data;

wherein the processor, if the scanned barcode information corresponds to the data, executes computer-readable instructions to actuate the garage door control system to permit entry;

wherein the transmitter/receiver device sends a notification to the external software application that the garage door control system has opened;

wherein the transmitter/receiver device sends a notification to the external software application that the garage door control system was closed; and wherein the transmitter/receiver device sends a notification to the external software application that the package corresponding to the matched barcode was delivered.

12. The system of claim 11, wherein the transmitter/receiver device is a radiofrequency transmitter/receiver configured to communicate through the use of WiFi and Bluetooth Low Energy connections.

13. The system of claim 11, wherein the data is a tracking number.

14. The system of claim 11, wherein the garage door control system can only be actuated by the console device.

15. The system of claim 11, wherein the console device is capable of accepting as a further means of authorization a numeric code, a password, an authorized fingerprint, or a combination thereof.

16. The system of claim 11, wherein the displaceable cover is configured to be disposed over the screen in the closed position.

17. The system of claim 11, further comprising a solar cell operatively coupled to the console device, the solar cell configured to generate power to charge the console device.

18. The system of claim 11, further comprising an obstruction sensor communicatively coupled to the console device; and wherein the obstruction sensor, if the garage door control system is open, scans for obstructions in a closing path of the garage door control system on a fixed interval; and wherein the obstruction sensor, if no obstructions are detected in the closing path, actuates the console device to actuate the garage door control system to close.

19. The system of claim 11, wherein the garage door unit comprises a camera.

20. The system of claim 11, wherein the garage door unit comprises a distance sensor.

* * * * *